US011594177B2

(12) United States Patent
Lee et al.

(10) Patent No.: US 11,594,177 B2
(45) Date of Patent: Feb. 28, 2023

(54) IMAGE DISPLAY APPARATUS

(71) Applicant: LG ELECTRONICS INC., Seoul (KR)

(72) Inventors: Jonghyung Lee, Seoul (KR); Kangsoo Kim, Seoul (KR); Hyomin Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/277,493

(22) PCT Filed: Sep. 18, 2019

(86) PCT No.: PCT/KR2019/012064
§ 371 (c)(1),
(2) Date: Mar. 18, 2021

(87) PCT Pub. No.: WO2020/060187
PCT Pub. Date: Mar. 26, 2020

(65) Prior Publication Data
US 2021/0319751 A1 Oct. 14, 2021

(30) Foreign Application Priority Data
Sep. 18, 2018 (KR) .......................... 10-2018-0111808

(51) Int. Cl.
G09G 3/3233 (2016.01)
G06F 3/033 (2013.01)
(Continued)

(52) U.S. Cl.
CPC ........... G09G 3/3233 (2013.01); G06F 3/033 (2013.01); G06F 3/0482 (2013.01);
(Continued)

(58) Field of Classification Search
CPC ............... G09G 3/3233; G09G 3/3283; G09G 2320/0233; G09G 2320/0626; G09G 2360/16
See application file for complete search history.

(56) References Cited

U.S. PATENT DOCUMENTS

2016/0104438 A1* 4/2016 Han ........................ G06T 5/009
345/690
2017/0061591 A1* 3/2017 Park .......................... G06T 7/90
(Continued)

FOREIGN PATENT DOCUMENTS

| KR | 1020160082889 | 7/2016 |
| KR | 1020170031941 | 3/2017 |
| KR | 1020170114813 | 10/2017 |

OTHER PUBLICATIONS

European Patent Office Application Serial No. 19862520.4, Search Report dated May 3, 2022, 10 pages.
(Continued)

Primary Examiner — Dennis P Joseph
(74) Attorney, Agent, or Firm — Lee, Hong, Degerman, Kang & Waimey PC

(57) ABSTRACT

The present disclosure relates to an image display apparatus. The image display apparatus includes: a display including an organic light emitting diode panel (OLED panel); and a controller configured to control the display, wherein the controller calculates an Average Picture Level (APL) of an input image, and in response to the calculated APL being greater than or equal to a first reference value in a high-dynamic range (HDR) mode, the controller decreases the APL and perform luminance conversion based on the decreased APL, and in response to the calculated APL being greater than or equal to the first reference value in a normal mode rather than the HDR mode, the controller performs luminance conversion based on the calculated APL. Accord-
(Continued)

ingly, luminance representation may be improved during displaying image.

13 Claims, 21 Drawing Sheets

(51) Int. Cl.
*G06F 3/0482* (2013.01)
*G09G 3/3266* (2016.01)
*G09G 3/3283* (2016.01)

(52) U.S. Cl.
CPC ......... *G09G 3/3266* (2013.01); *G09G 3/3283* (2013.01); *G09G 2320/0233* (2013.01); *G09G 2320/0626* (2013.01); *G09G 2354/00* (2013.01); *G09G 2360/16* (2013.01)

(56) References Cited

U.S. PATENT DOCUMENTS

| 2018/0025700 | A1 | 1/2018 | Suzuki et al. |
| 2018/0130188 | A1 | 5/2018 | Farrell et al. |
| 2018/0144690 | A1 | 5/2018 | Inokawa |
| 2019/0295454 | A1* | 9/2019 | Urabe ..................... G09G 3/22 |

OTHER PUBLICATIONS

PCT International Application No. PCT/KR2019/012064, International Search Report dated Jan. 16, 2020, 3 pages.
Kang et al., "Hybrid Tone Mapping Technique Considering Contrast and Texture Area Information for HDR Image Restoration," JBE vol. 22, No. 4, Jul. 2017, 13 Pages.
Korean Intellectual Property Office Application No. 10-2018-0111808, Office Action dated Dec. 16, 2022, 7 pages.

* cited by examiner

IMAGE DISPLAY APPARATUS

CROSS-REFERENCE TO RELATED APPLICATIONS

This application is the National Stage filing under 35 U.S.C. 371 of International Application No. PCT/KR2019/012064, filed on Sep. 18, 2019, which claims the benefit of earlier filing date and right of priority to Korean Application No. 10-2018-0111808, filed on Sep. 18, 2018, the contents of which are all hereby incorporated by reference herein their entirety.

BACKGROUND OF THE DISCLOSURE

1. Field of the Disclosure

The present disclosure relates to an image display apparatus, and more particularly to an image display apparatus capable of improving luminance during displaying image.

2. Description of the Related Art

An image display apparatus is an apparatus for providing an image that a user can watch. The user can watch various images through the image display apparatus.

Recently, research is conducted on various methods to improve luminance representation during display of images captured by a camera or external input images.

SUMMARY

It is an object of the present disclosure to provide an image display apparatus capable of improving luminance during displaying image.

In accordance with an aspect of the present disclosure, the above and other objects can be accomplished by providing an image display apparatus, including: a display including an organic light emitting diode panel (OLED panel); and a controller configured to control the display, wherein the controller calculates an Average Picture Level (APL) of an input image, and in response to the calculated APL being greater than or equal to a first reference value in a high-dynamic range (HDR) mode, the controller decreases the APL and perform luminance conversion based on the decreased APL, and in response to the calculated APL being greater than or equal to the first reference value in a normal mode rather than the HDR mode, the controller performs luminance conversion based on the calculated APL.

Meanwhile, in response to the calculated APL being greater than or equal to the first reference value while not being in the HDR mode, the controller may control luminance conversion to be performed based on the calculated APL.

Meanwhile, in the HDR mode, in response to the calculated APL being a first APL which is greater than or equal to the first reference value, the controller may control the first APL to be changed to a second APL, which is lower than the first reference value, and may control luminance conversion to be performed based on the second APL.

Meanwhile, during luminance conversion based on the second APL, the controller may increase luminance of a first region of the input image, which is higher than a first reference luminance.

Meanwhile, the controller may control luminance of a region of the input image, which is lower than or equal to a second reference luminance lower than the first reference luminance, to remain as it is or to decrease.

Meanwhile, as the second APL increases, the controller may decrease a luminance increment during luminance conversion.

Meanwhile, in the HDR mode, in response to the calculated APL being a third APL which is lower than the first reference value, the controller may control luminance conversion to be performed based on the third APL.

Meanwhile, during the luminance conversion based on the second APL rather than the third APL, the controller may increase luminance by a greater increment.

Meanwhile, in the normal mode rather than the HDR mode, in response to the calculated APL being the first APL which is greater than or equal to the first reference value, the controller may control luminance conversion to be performed based on the first APL.

Meanwhile, during the luminance conversion based on the second APL rather than the first APL, the controller may increase luminance by a greater increment.

Meanwhile, while controlling luminance of the input image based on the APL, in response to there being a first luminance region and a second luminance region in the input image, the second luminance region having luminance lower than that of the first luminance region, the controller may control luminance of the first luminance region to increase more.

Meanwhile, in response to a setting input, the controller may change a level of the first reference value.

Meanwhile, as the level of the first reference value decreases, the controller may expand an APL-variable region, and may increase luminance of the expanded APL-variable region.

Meanwhile, in response to an input of an image quality setting, the controller may control displaying of an image quality setting menu for setting an image quality, and in response to a dynamic tone mapping item being selected from the image quality setting menu, the controller may control displaying of a dynamic tone mapping screen for changing the first reference value.

Meanwhile, the controller may receive a pointing signal from a remote controller, and may control displaying of a pointer, corresponding to the pointing signal, on the dynamic tone mapping screen.

Meanwhile, while receiving an image having a first pattern, and a second pattern which is gradually reduced in size, in response to a size of the second pattern being greater than or equal to a reference size, the controller may increase luminance of the pattern, and in response to the size of the second pattern being smaller than the reference size, the controller may control luminance of the pattern to be maintained at a predetermined level or to remain as it is.

In accordance with another aspect of the present disclosure, the above and other objects can be accomplished by providing an image display apparatus, including: a display; and a controller configured to control the display, wherein while receiving an image having a first pattern, and a second pattern which is gradually reduced in size, in response to a size of the second pattern being greater than or equal to a reference size, the controller may increase luminance of the pattern, and in response to the size of the second pattern being smaller than the reference size, the controller may control luminance of the pattern to be maintained at a predetermined level or to remain as it is.

Meanwhile, the controller may control the luminance of the first pattern to remain as it is or to decrease.

DETAILED DESCRIPTION OF THE PREFERRED EMBODIMENTS

Hereinafter, embodiments of the present disclosure will be described in further detail with reference to the accompanying drawings.

In the present disclosure, the terms "module" and "unit", which are used herein to signify components, are merely intended to facilitate explanation of the present disclosure, and the terms do not have any distinguishable difference in meaning or role. Thus, the terms "module" and "unit" may be used interchangeably.

Figure 1:
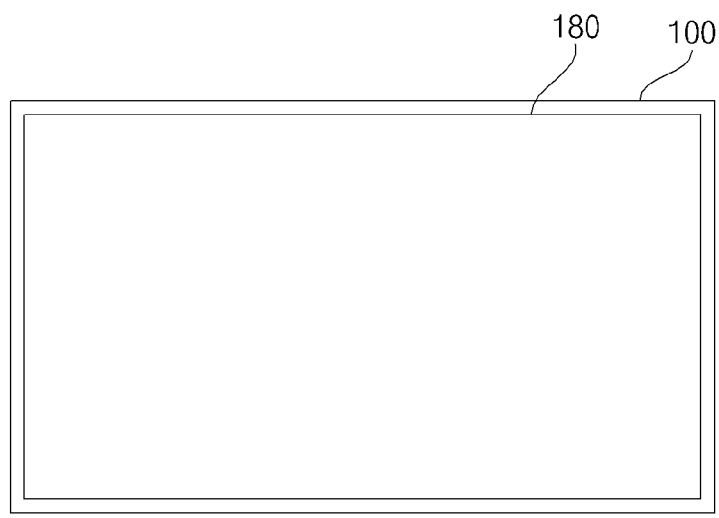
FIG. 1 is a diagram showing an image display apparatus according to an embodiment of the present disclosure.

FIG. 1 is a diagram showing an image display apparatus according to an embodiment of the present disclosure.

Referring to the drawing, an image display apparatus 100 according to an embodiment of the present disclosure may include a display 180.

Meanwhile, the display 180 may be implemented with any one of various panels. For example, the display 180 may be any one of a liquid crystal display panel (LCD panel), an organic light emitting diode panel (OLED panel), and an inorganic light emitting diode panel (LED panel), and the like.

Meanwhile, the present disclosure will be focused on an example in which the display 180 includes an organic light emitting diode panel (OLED panel).

The image display apparatus according to an embodiment of the present disclosure includes: the display 180 having an OLED panel 210; and a controller 170 configured to control the display 180, wherein the controller 170 calculates an Average Picture Level (APL) of an input image, and in response to the calculated APL being greater than or equal to a first reference value in a high-dynamic range (HDR) mode APref, the controller decreases the APL and perform luminance conversion based on the decreased APL, and in response to the calculated APL being greater than or equal to the first reference value in a normal mode rather than the HDR mode APref, the controller performs luminance conversion based on the calculated APL, thereby improving luminance during displaying image.

Particularly, in the HDR mode, luminance representation may be improved during displaying image.

Meanwhile, in response to the calculated APL being greater than or equal to the first reference value while not being in the HDR mode APref, the controller may control luminance conversion to be performed based on the calculated APL. Accordingly, in the normal mode, luminance representation during displaying image is reduced compared to the HDR mode.

Meanwhile, the image display apparatus according to another embodiment of the present disclosure includes: the display 180; and the controller 170 configured to control the display 180, wherein while receiving an image having a first pattern PTma, and a second pattern which is gradually reduced in size, in response to a size of the second pattern being greater than or equal to a reference size, the controller may increase luminance of the pattern, and in response to the size of the second pattern being smaller than the reference size, the controller may control luminance of the pattern to be maintained at a predetermined level or to remain as it is. Accordingly, luminance representation may be improved during displaying image.

Meanwhile, the controller 170 may control the luminance of the first pattern PTma to remain as it is or to decrease. Accordingly, luminance representation may be improved during displaying image.

Various operating methods of the aforementioned image display apparatus 100 will be described in further detail later with reference to FIG. 7 and the following figures.

Meanwhile, the image display apparatus 100 of FIG. 1 may be a TV, a monitor, a tablet PC, a mobile terminal, a vehicle display, and the like.

Figure 2:
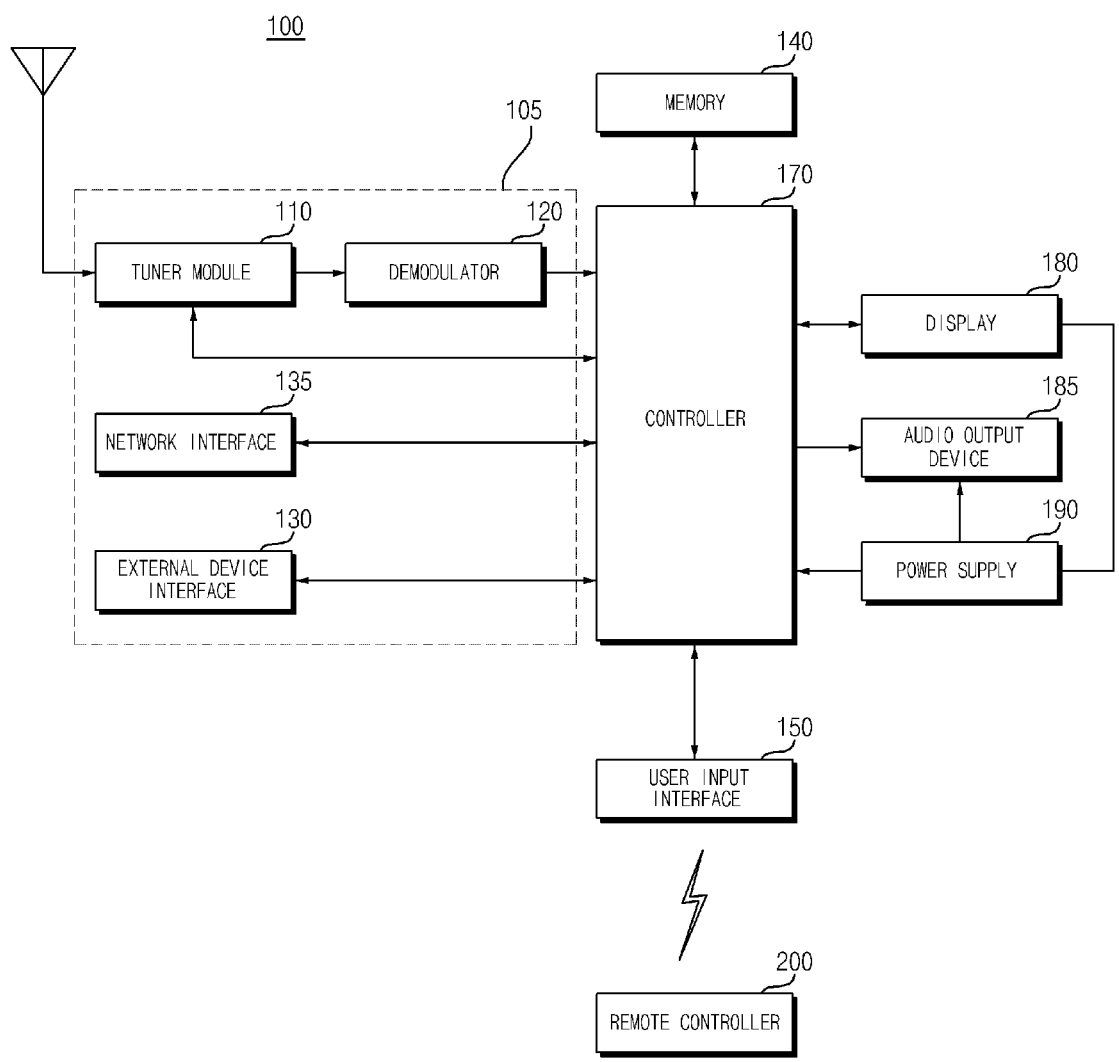
FIG. 2 is an example of an internal block diagram of the image display apparatus of FIG. 1.

FIG. 2 is an example of an internal block diagram of the image display apparatus of FIG. 1.

Referring to FIG. 2, the image display apparatus 100 according to an embodiment of the present disclosure includes a broadcast receiver 105, an external device interface 130, a memory 140, a user input interface 150, a sensor device (not shown), a controller 170, a display 180, and an audio output device 185.

The broadcast receiver 105 may include a tuner module 110, a demodulator 120, a network interface 135, and an external device interface 130.

Meanwhile, unlike the drawing, the image receiver 105 may include only the tuner module 110, the demodulator 120, and the external device interface 130. That is, the network interface 135 may not be included.

The tuner module 110 selects an RF broadcast signal corresponding to a channel selected by a user or all pre-stored channels among radio frequency (RF) broadcast signals received through an antenna (not shown). In addition, the selected RF broadcast signal is converted into an intermediate frequency signal, a baseband image, or an audio signal.

For example, if the selected RF broadcast signal is a digital broadcast signal, it is converted into a digital IF signal (DIF). If the selected RF broadcast signal is an analog broadcast signal, it is converted into an analog baseband image or audio signal (CVBS/SIF). That is, the tuner module 110 may process a digital broadcast signal or an analog broadcast signal. The analog baseband image or audio signal (CVBS/SIF) output from the tuner module 110 may be directly input to the controller 170.

Meanwhile, the tuner module 110 may include a plurality of tuners for receiving broadcast signals of a plurality of channels. Alternatively, a single tuner that simultaneously receives broadcast signals of a plurality of channels is also available.

The demodulator 120 receives the converted digital IF signal DIF from the tuner module 110 and performs a demodulation operation.

The demodulator 120 may perform demodulation and channel decoding and then output a stream signal TS. At this time, the stream signal may be a multiplexed signal of an image signal, an audio signal, or a data signal.

The stream signal output from the demodulator 120 may be input to the controller 170. The controller 170 performs demultiplexing, image/audio signal processing, and the like, and then outputs an image to the display 180 and outputs audio to the audio output device 185.

The external device interface 130 may transmit or receive data with a connected external apparatus (not shown), e.g., a set-top box 50. To this end, the external device interface 130 may include an A/V input and output device (not shown).

The external device interface 130 may be connected in wired or wirelessly to an external apparatus such as a digital versatile disk (DVD), a Blu ray, a game equipment, a camera, a camcorder, a computer (note book), and a set-top box, and may perform an input/output operation with an external apparatus.

The A/V input and output device may receive image and audio signals from an external apparatus. Meanwhile, a wireless communicator (not shown) may perform short-range wireless communication with other electronic apparatus.

Through the wireless communicator (not shown), the external device interface 130 may exchange data with an adjacent mobile terminal 600. In particular, in a mirroring mode, the external device interface 130 may receive device information, executed application information, application image, and the like from the mobile terminal 600.

The network interface 135 provides an interface for connecting the image display apparatus 100 to a wired/wireless network including the Internet network. For example, the network interface 135 may receive, via the network, content or data provided by the Internet, a content provider, or a network operator.

Meanwhile, the network interface 135 may include a wireless communicator (not shown).

The memory 140 may store a program for each signal processing and control in the controller 170, and may store signal-processed image, audio, or data signal.

In addition, the memory 140 may serve to temporarily store image, audio, or data signal input to the external device interface 130. In addition, the memory 140 may store information on a certain broadcast channel through a channel memory function such as a channel map.

Although FIG. 2 illustrates that the memory is provided separately from the controller 170, the scope of the present disclosure is not limited thereto. The memory 140 may be included in the controller 170.

The user input interface 150 transmits a signal input by the user to the controller 170 or transmits a signal from the controller 170 to the user.

For example, the user input interface 150 may transmit/receive a user input signal such as power on/off, channel selection, screen setting, etc., from a remote controller 200, may transfer a user input signal input from a local key (not shown) such as a power key, a channel key, a volume key, a set value, etc., to the controller 170, may transfer a user input signal input from a sensor device (not shown) that senses a user's gesture to the controller 170, or may transmit a signal from the controller 170 to the sensor device (not shown).

The controller 170 may demultiplex the input stream through the tuner module 110, the demodulator 120, the network interface 135, or the external device interface 130, or may process the demultiplexed signals to generate and output a signal for image or audio output.

The image signal processed by the controller 170 is input to the display 180, and may be displayed as an image corresponding to the image signal. In addition, the image signal processed by the controller 170 may be input to the external output apparatus through the external device interface 130.

The audio signal processed by the controller 170 may be output to the audio output device 185 as an audio signal. In addition, the audio signal processed by the controller 170 may be input to the external output apparatus through the external device interface 130.

Although not illustrated in FIG. 2, the controller 170 may include a demultiplexer, an image processor, and the like, which will be described later with reference to FIG. 3.

In addition, the controller 170 may control the overall operation of the image display apparatus 100. For example, the controller 170 may control the tuner module 110 to control the tuning of the RF broadcast corresponding to the channel selected by the user or the previously stored channel.

In addition, the controller 170 may control the image display apparatus 100 according to a user command input through the user input interface 150 or an internal program.

Meanwhile, the controller 170 may control the display 180 to display an image. In this case, the image displayed on the display 180 may be a still image or a moving image, and may be a 2D image or a 3D image.

Meanwhile, the controller 170 may display a predetermined object in an image displayed on the display 180. For example, the object may be at least one of a connected web screen (newspaper, magazine, etc.), an electronic program guide (EPG), various menus, a widget, an icon, a still image, a moving image, and a text.

Meanwhile, the controller 170 may recognize the position of the user based on the image photographed by a photographing device (not shown). For example, the distance (z-axis coordinate) between a user and the image display apparatus 100 may be determined. In addition, the x-axis coordinate and the y-axis coordinate in the display 180 corresponding to a user position may be determined.

The display 180 generates a driving signal by converting an image signal, a data signal, an OSD signal, a control signal processed by the controller 170, an image signal, a data signal, a control signal, and the like received from the external device interface 130.

Meanwhile, the display 180 may be configured as a touch screen and used as an input device in addition to an output device.

The audio output device 185 receives a signal processed by the controller 170 and outputs it as an audio.

The photographing device (not shown) photographs a user. The photographing device (not shown) may be implemented by a single camera, but the present disclosure is not limited thereto and may be implemented by a plurality of cameras. Image information photographed by the photographing device (not shown) may be input to the controller 170.

The controller 170 may sense a gesture of the user based on each of the images photographed by the photographing device (not shown), the signals detected from the sensor device (not shown), or a combination thereof.

The power supply 190 supplies corresponding power throughout the image display apparatus 100. Particularly, the power supply 190 may supply power to the controller 170 which may be implemented in the form of a system on chip (SOC), a display 180 for displaying an image, and an audio output device 185 for audio output.

Specifically, the power supply 190 may include a converter for converting an AC power into a DC power, and a DC/DC converter for converting the level of the DC power.

The remote controller 200 transmits the user input to the user input interface 150. To this end, the remote controller 200 may use Bluetooth, a radio frequency (RF) communication, an infrared (IR) communication, an Ultra Wideband (UWB), ZigBee, or the like. In addition, the remote controller 200 may receive the image, audio, or data signal output from the user input interface 150, and display it on the remote controller 200 or output it as an audio.

Meanwhile, the image display apparatus 100 may be a fixed or mobile digital broadcasting receiver capable of receiving digital broadcasting.

Meanwhile, a block diagram of the image display apparatus 100 shown in FIG. 2 is a block diagram for an embodiment of the present disclosure. Each component of the block diagram may be integrated, added, or omitted according to a specification of the image display apparatus 100 actually implemented. That is, two or more components may be combined into a single component as needed, or a single component may be divided into two or more components. The function performed in each block is described for the purpose of illustrating embodiments of the present disclosure, and specific operation and apparatus do not limit the scope of the present disclosure.

Figure 3:
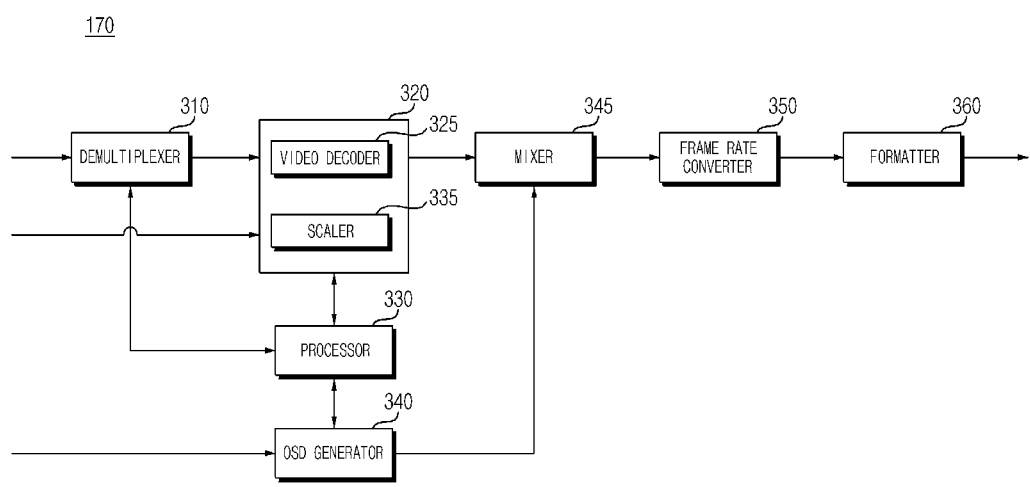
FIG. 3 is an example of an internal block diagram of the controller in FIG. 2.

FIG. 3 is an example of an internal block diagram of the signal processor in FIG. 2.

Referring to the drawing, the controller 170 according to an embodiment of the present disclosure may include a demultiplexer 310, a video processor 320, a processor 330, an OSD processor 340, a mixer 345, a frame rate converter 350, and a formatter 360. In addition, the processor 170 may further include an audio processor (not shown) and a data processor (not shown).

The demultiplexer 310 demultiplexes the input stream. For example, when an MPEG-2 TS is input, it may be demultiplexed into image, audio, and data signal, respectively. Here, the stream signal input to the demultiplexer 310 may be a stream signal output from the tuner module 110, the demodulator 120, or the external device interface 130.

The video processor 320 may perform image processing on a demultiplexed image signal. To this end, the video processor 320 may include a video decoder 325 and a scaler 335.

The video decoder 325 decodes a demultiplexed image signal, and the scaler 335 performs scaling so that the resolution of the decoded image signal may be output from the display 180.

The video decoder 325 may include a decoder of various standards. For example, a 3D video decoder for MPEG-2, H.264 decoder, a color image, and a depth image, and a decoder for a multiple view image may be provided.

The processor 330 may control the overall operation of the image display apparatus 100 or the controller 170. For example, the processor 330 may control the tuner 110 to tune in to an RF broadcast corresponding to a channel selected by a user or a prestored channel.

In addition, the processor 330 may control the image display apparatus 100 according to a user command input through the user input interface 150 or an internal program.

Further, the processor 330 may control data transmission with the network interface 135 or the external device interface 130.

In addition, the processor 330 may control operations of the demultiplexer 310, the image processor 320, the OSD processor 340, and the like in the controller 170.

The OSD processor 340 generates an OSD signal according to a user input or by itself. For example, based on a user input signal, the OSD processor 340 may generate a signal for displaying various pieces of information as a graphic or a text on the screen of the display 180. The generated OSD signal may include various data such as a user interface screen of the image display apparatus 100, various menu screens, a widget, and an icon. In addition, the generated OSD signal may include a 2D object or a 3D object.

In addition, the OSD processor 340 may generate a pointer that may be displayed on the display, based on a pointing signal input from the remote controller 200. In particular, such pointer may be generated by a pointing signal processor, and the OSD processor 240 may include a pointing signal processor (not shown) for processing such pointing signal. Obviously, the pointing signal processor (not shown) may be provided separately from the OSD processor 240, without being provided therein.

The mixer 345 may mix the OSD signal generated by the OSD processor 340 with the decoded video signal processed by the video processor 320. The mixed signal is provided to the frame rate converter 350.

The frame rate converter 350 may convert a frame rate of the input image. The frame rate converter 350 may output the image without separate frame rate conversion.

Meanwhile, the formatter 360 may change a format of an input image signal into a format suitable for displaying the image signal on a display and output the image signal in the changed format.

The formatter 360 may change the format of the image signal. For example, the formatter 360 may change the format of the 3D image signal into any one of various 3D formats such as a side by side format, a top/down format, a frame sequential format, an interlaced format, a checker box format, and the like.

Meanwhile, the audio processor (not shown) in the controller 170 may perform the audio processing of the demultiplexed audio signal. To this end, the audio processor (not shown) may include various decoders.

In addition, the audio processor (not shown) in the controller 170 may process a base, a treble, a volume control, and the like.

The data processor (not shown) in the controller 170 may perform data processing of the demultiplexed data signal. For example, when the demultiplexed data signal is a coded data signal, it may be decoded. The encoded data signal may be electronic program guide information including broadcast information such as a start time and an end time of a broadcast program broadcasted on each channel.

Meanwhile, a block diagram of the controller 170 shown in FIG. 3 is a block diagram for an embodiment of the present disclosure. Each component of the block diagram may be integrated, added, or omitted according to a specification of the controller 170 actually implemented.

Particularly, the frame rate converter 350 and the formatter 360 may be provided separately without being provided in the controller 170, or may be provided separately as one module.

Figure 4A:
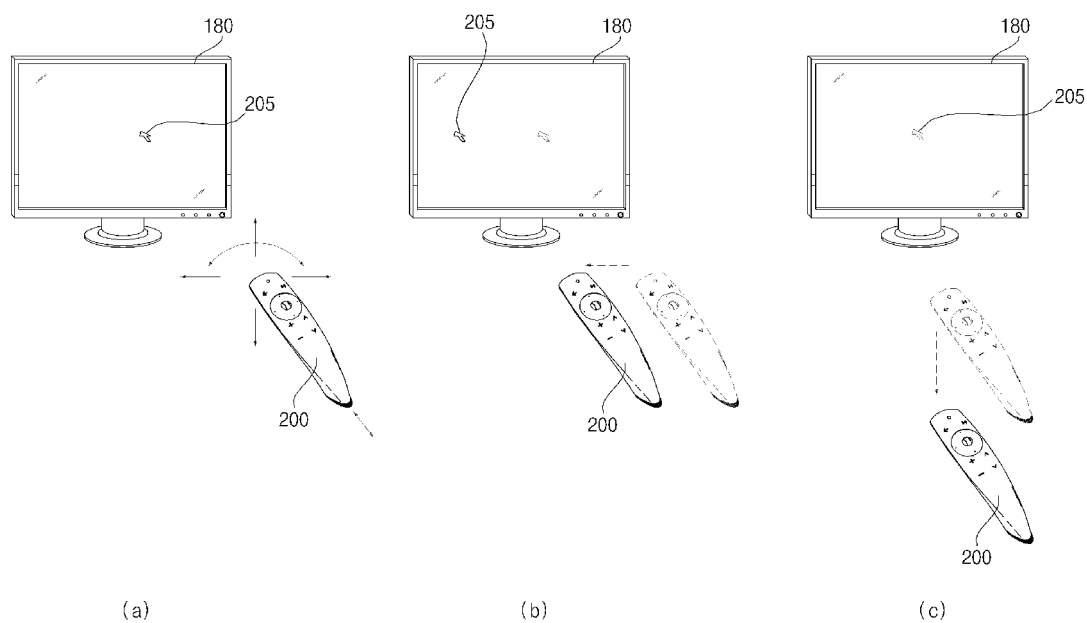
FIG. 4A is a diagram illustrating a control method of a remote controller of FIG. 2.

FIG. 4A is a diagram illustrating a control method of a remote controller of FIG. 2.

As shown in FIG. 4A(a), it is illustrated that a pointer 205 corresponding to the remote controller 200 is displayed on the display 180.

The user may move or rotate the remote controller 200 up and down, left and right (FIG. 4A(b)), and back and forth (FIG. 4A(c)). The pointer 205 displayed on the display 180 of the image display apparatus corresponds to the motion of the remote controller 200. Such a remote controller 200 may be referred to as a space remote controller or a 3D pointing apparatus, because the pointer 205 is moved and displayed according to the movement in a 3D space, as shown in the drawing.

FIG. 4A(b) illustrates that when the user moves the remote controller 200 to the left, the pointer 205 displayed on the display 180 of the image display apparatus also moves to the left correspondingly.

Information on the motion of the remote controller 200 detected through a sensor of the remote controller 200 is transmitted to the image display apparatus. The image display apparatus may calculate the coordinate of the pointer 205 from the information on the motion of the remote controller 200. The image display apparatus may display the pointer 205 to correspond to the calculated coordinate.

FIG. 4A(c) illustrates a case where the user moves the remote controller 200 away from the display 180 while pressing a specific button of the remote controller 200. Thus, a selection area within the display 180 corresponding to the pointer 205 may be zoomed in so that it may be displayed to be enlarged. On the other hand, when the user moves the remote controller 200 close to the display 180, the selection area within the display 180 corresponding to the pointer 205 may be zoomed out so that it may be displayed to decrease. Meanwhile, when the remote controller 200 moves away from the display 180, the selection area may be zoomed out, and when the remote controller 200 approaches the display 180, the selection area may be zoomed in.

Meanwhile, when the specific button of the remote controller 200 is pressed, it is possible to exclude the recognition of vertical and lateral movement. That is, when the remote controller 200 moves away from or approaches the display 180, the up, down, left, and right movements are not recognized, and only the forward and backward movements are recognized. Only the pointer 205 is moved according to the up, down, left, and right movements of the remote controller 200 in a state where the specific button of the remote controller 200 is not pressed.

Meanwhile, the moving speed or the moving direction of the pointer 205 may correspond to the moving speed or the moving direction of the remote controller 200.

Figure 4B:
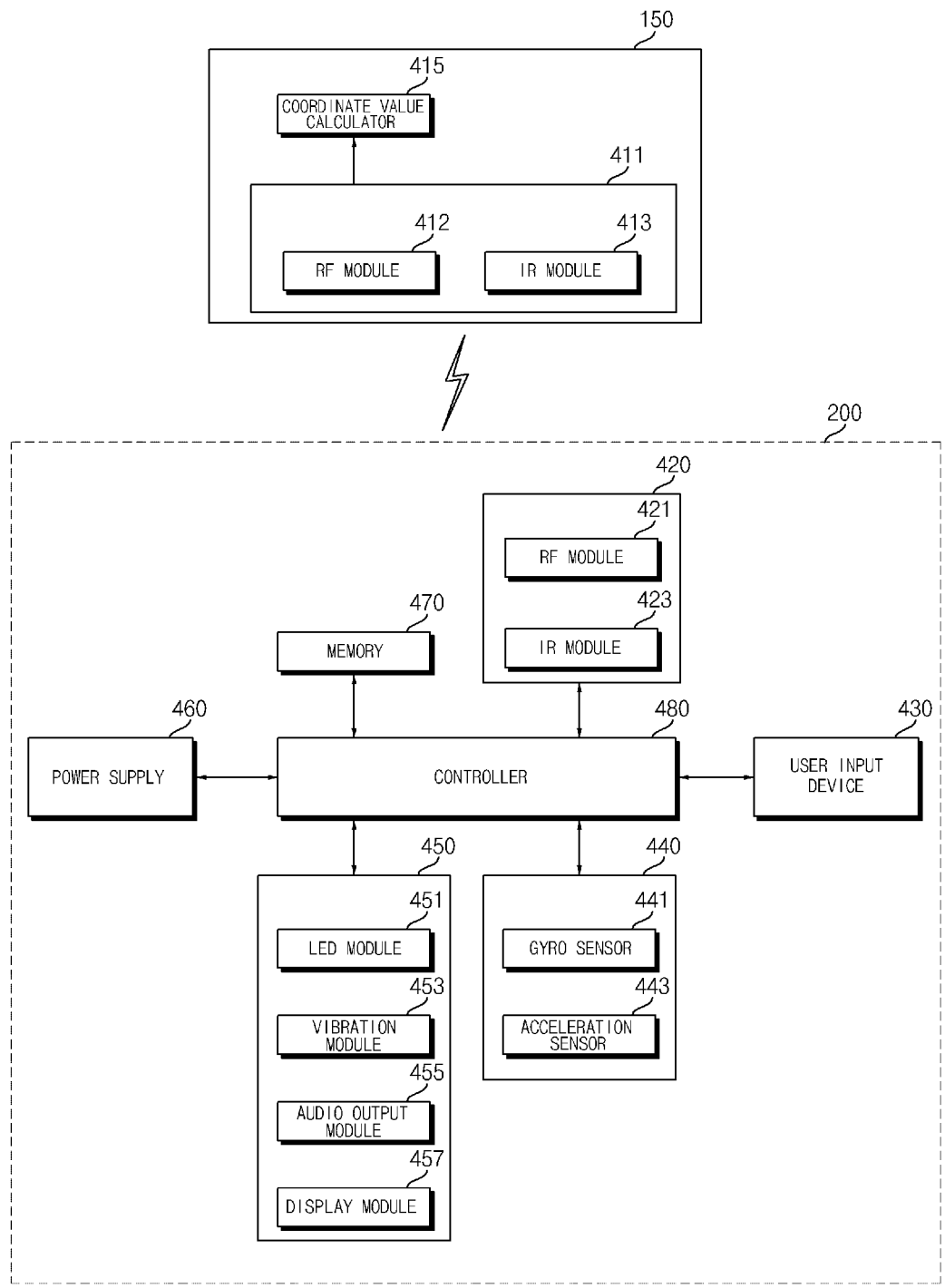
FIG. 4B is an internal block diagram of the remote controller of FIG. 2.

FIG. 4B is an internal block diagram of the remote controller of FIG. 2.

Referring to the drawing, the remote controller 200 includes a wireless communicator 425, a user input device 430, a sensor device 440, an output device 450, a power supply 460, a memory 470, and a controller 480.

The wireless communicator 425 transmits/receives a signal to/from any one of the image display apparatuses according to the embodiments of the present disclosure described above. Among the image display apparatuses according to the embodiments of the present disclosure, one image display apparatus 100 will be described as an example.

In this embodiment, the remote controller 200 may include an RF module 421 for transmitting and receiving signals to and from the image display apparatus 100 according to a RF communication standard. In addition, the remote controller 200 may include an IR module 423 for transmitting and receiving signals to and from the image display apparatus 100 according to an IR communication standard.

In this embodiment, the remote controller 200 transmits a signal containing information on the motion of the remote controller 200 to the image display apparatus 100 through the RF module 421.

In addition, the remote controller 200 may receive the signal transmitted by the image display apparatus 100 through the RF module 421. In addition, if necessary, the remote controller 200 may transmit a command related to power on/off, channel change, volume change, and the like to the image display apparatus 100 through the IR module 423.

The user input device 430 may be implemented by a keypad, a button, a touch pad, a touch screen, or the like. The user may operate the user input device 430 to input a command related to the image display apparatus 100 to the remote controller 200. When the user input device 430 includes a hard key button, the user may input a command related to the image display apparatus 100 to the remote controller 200 through a push operation of the hard key button. When the user input device 430 includes a touch screen, the user may touch a soft key of the touch screen to input the command related to the image display apparatus 100 to the remote controller 200. In addition, the user input device 430 may include various types of input means such as a scroll key, a jog key, etc., which may be operated by the user, and the present disclosure does not limit the scope of the present disclosure.

The sensor device 440 may include a gyro sensor 441 or an acceleration sensor 443. The gyro sensor 441 may sense information about the motion of the remote controller 200.

For example, the gyro sensor 441 may sense information on the operation of the remote controller 200 based on the x, y, and z axes. The acceleration sensor 443 may sense information on the moving speed of the remote controller 200. Meanwhile, a distance measuring sensor may be further provided, and thus, the distance to the display 180 may be sensed.

The output device 450 may output an image or an audio signal corresponding to the operation of the user input device 430 or a signal transmitted from the image display apparatus 100. Through the output device 450, the user may recognize whether the user input device 430 is operated or whether the image display apparatus 100 is controlled.

For example, the output device 450 may include an LED module 451 that is turned on when the user input device 430 is operated or a signal is transmitted/received to/from the image display apparatus 100 through the wireless communicator 425, a vibration module 453 for generating a vibration, an audio output module 455 for outputting an audio, or a display module 457 for outputting an image.

The power supply 460 supplies power to the remote controller 200. When the remote controller 200 is not moved for a certain time, the power supply 460 may stop the supply of power to reduce a power waste. The power supply 460 may resume power supply when a certain key provided in the remote controller 200 is operated.

The memory 470 may store various types of programs, application data, and the like necessary for the control or operation of the remote controller 200. If the remote controller 200 wirelessly transmits and receives a signal to/from the image display apparatus 100 through the RF module 421, the remote controller 200 and the image display apparatus 100 transmit and receive a signal through a certain frequency band. The controller 480 of the remote controller 200 may store information about a frequency band or the like for wirelessly transmitting and receiving a signal to/from the image display apparatus 100 paired with the remote controller 200 in the memory 470 and may refer to the stored information.

The controller 480 controls various matters related to the control of the remote controller 200. The controller 480 may transmit a signal corresponding to a certain key operation of the user input device 430 or a signal corresponding to the motion of the remote controller 200 sensed by the sensor device 440 to the image display apparatus 100 through the wireless communicator 425.

The user input interface 150 of the image display apparatus 100 includes a wireless communicator 151 that may wirelessly transmit and receive a signal to and from the remote controller 200 and a coordinate value calculator 415 that may calculate the coordinate value of a pointer corresponding to the operation of the remote controller 200.

The user input interface 150 may wirelessly transmit and receive a signal to and from the remote controller 200 through the RF module 412. In addition, the user input interface 150 may receive a signal transmitted by the remote controller 200 through the IR module 413 according to an IR communication standard.

The coordinate value calculator 415 may correct a hand shake or an error from a signal corresponding to the operation of the remote controller 200 received through the wireless communicator 151 and may calculate the coordinate value (x, y) of the pointer 205 to be displayed on the display 180.

The transmission signal of the remote controller 200 inputted to the image display apparatus 100 through the user input interface 150 is transmitted to the controller 170 of the image display apparatus 100. The controller 170 may determine the information on the operation of the remote controller 200 and the key operation from the signal transmitted from the remote controller 200, and, correspondingly, control the image display apparatus 100.

In another example, the remote controller 200 may calculate the pointer coordinate value corresponding to the operation and output it to the user input interface 150 of the image display apparatus 100. In this case, the user input interface 150 of the image display apparatus 100 may transmit information on the received pointer coordinate value to the controller 170 without a separate correction process of hand shake or error.

In yet another example, unlike the drawing, the coordinate value calculator 415 may be provided in the controller 170, not in the user input interface 150.

Figure 5:
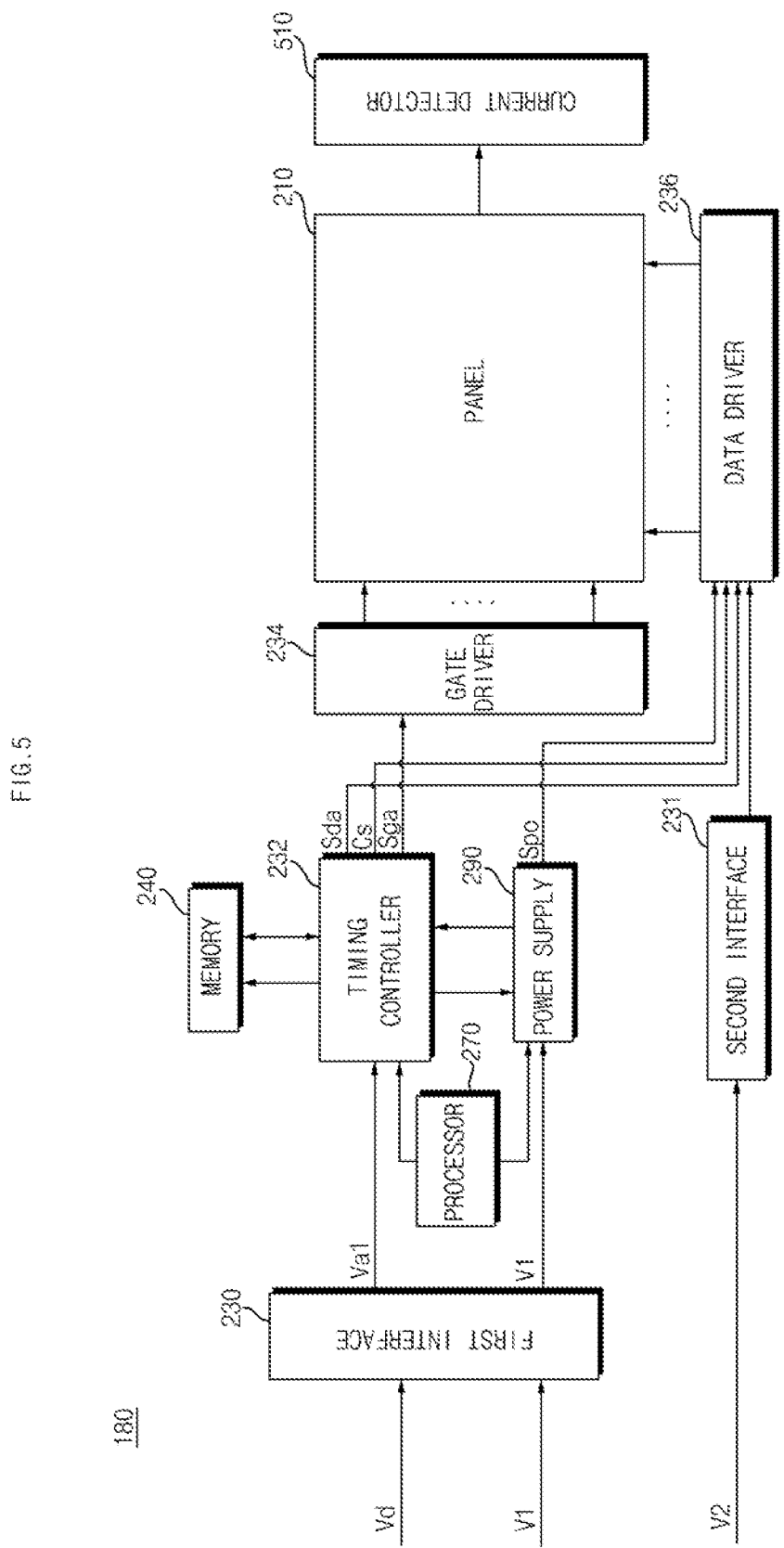
FIG. 5 is an internal block diagram of a display of FIG. 2.

FIG. 5 is an internal block diagram of a display of FIG. 2.

Referring to the drawing, the organic light emitting diode panel-based display 180 may include an organic light emitting diode panel 210, a first interface 230, a second interface 231, a timing controller 232, a gate driver 234, a data driver 236, a memory 240, a processor 270, a power supply 290, a current detector 510, and the like.

The display 180 receives an image signal Vd, a first DC power V1, and a second DC power V2, and may display a certain image based on the image signal Vd.

Meanwhile, the first interface 230 in the display 180 may receive the image signal Vd and the first DC power V1 from the controller 170.

Here, the first DC power V1 may be used for the operation of the power supply 290 and the timing controller 232 in the display 180.

Next, the second interface 231 may receive a second DC power V2 from an external power supply 190. Meanwhile, the second DC power V2 may be input to the data driver 236 in the display 180.

The timing controller 232 may output a data driving signal Sda and a gate driving signal Sga, based on the image signal Vd.

For example, when the first interface 230 converts the input image signal Vd and outputs the converted image signal va1, the timing controller 232 may output the data driving signal Sda and the gate driving signal Sga based on the converted image signal va1.

The timing controller 232 may further receive a control signal, a vertical synchronization signal Vsync, and the like, in addition to the image signal Vd from the controller 170.

In addition to the image signal Vd, based on a control signal, a vertical synchronization signal Vsync, and the like, the timing controller 232 generates a gate driving signal Sga for the operation of the gate driver 234, and a data driving signal Sda for the operation of the data driver 236.

Meanwhile, the timing controller 232 may further output a control signal Cs to the gate driver 234.

The gate driver 234 and the data driver 236 supply a scan signal and an image signal to the organic light emitting diode panel 210 through a gate line GL and a data line DL respectively, according to the gate driving signal Sga and the data driving signal Sda from the timing controller 232. Accordingly, the organic light emitting diode panel 210 displays a certain image.

Meanwhile, the organic light emitting diode panel 210 may include an organic light emitting layer. In order to display an image, a plurality of gate lines GL and data lines DL may be disposed in a matrix form in each pixel corresponding to the organic light emitting layer.

Meanwhile, the data driver 236 may output a data signal to the organic light emitting diode panel 210 based on a second DC power V2 from the second interface 231.

The power supply 290 may supply various power supplies to the gate driver 234, the data driver 236, the timing controller 232, and the like.

The current detector 510 may detect the current flowing in a sub-pixel of the organic light emitting diode panel 210. The detected current may be input to the processor 270 or the like, for a cumulative current calculation.

The processor 270 may control various operations in the display 180. For example, the processor 270 may control the gate driver 234, the data driver 236, the timing controller 232, and the like.

Meanwhile, the processor 270 may receive current information flowing in a sub-pixel of the organic light emitting diode panel 210 from the current detector 510.

In addition, the processor 270 may calculate the accumulated current of each subpixel of the organic light emitting diode panel 210, based on information of current flowing through the subpixel of the organic light emitting diode panel 210. The calculated accumulated current may be stored in the memory 240.

Meanwhile, the processor 270 may determine as burn-in, if the accumulated current of each sub-pixel of the organic light emitting diode panel 210 is equal to or greater than an allowable value.

For example, if the accumulated current of each subpixel of the OLED panel 210 is equal to or higher than 300000 A, the processor 270 may determine that a corresponding subpixel is a burn-in subpixel.

Meanwhile, if the accumulated current of each subpixel of the OLED panel 210 is close to an allowable value, the processor 270 may determine that a corresponding subpixel is a subpixel expected to burn in.

Meanwhile, based on a current detected by the current detector 510, the processor 270 may determine a subpixel, having the greatest accumulated current, to be a burn-in expected subpixel.

Meanwhile, based on a current detected by the current detector 1110, the processor 270 may calculate a burn-in subpixel or a burn-in expected subpixel of the OLED panel 210, and may control a current, lower than an allocated current, to flow through subpixels adjacent to the calculated burn-in subpixel or burn-in expected subpixel, thereby extending burn-in of sub-pixels adjacent to the burn-in subpixel. As a result, it is possible to extend the entire service life of the image display apparatus 100 having the OLED panel 210.

Meanwhile, the processor 270 may control a current, higher than the allocated current, to flow through the calculated burn-in subpixel, such that a low current may flow through the subpixels adjacent to the calculated burn-in subpixel, thereby preventing a phenomenon of decreasing luminance.

Meanwhile, if no burn-in occurs in the OLED panel 210, the processor 270 may control a current, lower than the allocated current, to flow through subpixels adjacent to the burn-in expected subpixel, which is expected to burn in, thereby extending burn-in of sub-pixels adjacent to the burn-in expected subpixel. As a result, it is possible to extend the entire service life of the image display apparatus 100 having the OLED panel 210.

Meanwhile, the processor 270 may control a data voltage, lower than an allocated data voltage, to be applied to subpixels adjacent to the calculated burn-in subpixel or burn-in expected subpixel.

Meanwhile, if no burn-in occurs in the OLED panel 210, the processor 270 may control a current, lower than the allocated current, to also flow through the burn-in expected subpixel which is expected to burn in, thereby extending burn-in of the burn-in expected subpixel. As a result, it is possible to extend the entire service life of the image display apparatus 100 having the OLED panel 210.

Meanwhile, the processor 270 may control a current having a second level, higher than a first level, to flow through a second subpixel located at a position further than a first subpixel among subpixels adjacent to the calculated burn-in subpixel or burn-in expected subpixel, such that by controlling a higher current to flow through the second subpixel which is expected to have a longer service life, it is possible to prevent a phenomenon of decreasing luminance.

Meanwhile, the processor 270 may calculate a subpixel, having the greatest accumulated current in the OLED panel, based on a current detected by the current detector 1110, and may control a current, lower than the allocated current, to flow through subpixels adjacent to the subpixel having the greatest accumulated current, thereby extending the entire service life of the image display apparatus 100 having the OLED panel 210.

Meanwhile, the processor 270 may control a lower current to flow through subpixels located closer to the subpixel having the greatest accumulated current, thereby extending the entire service life of the image display apparatus 100 having the OLED panel 210.

Figure 6A:
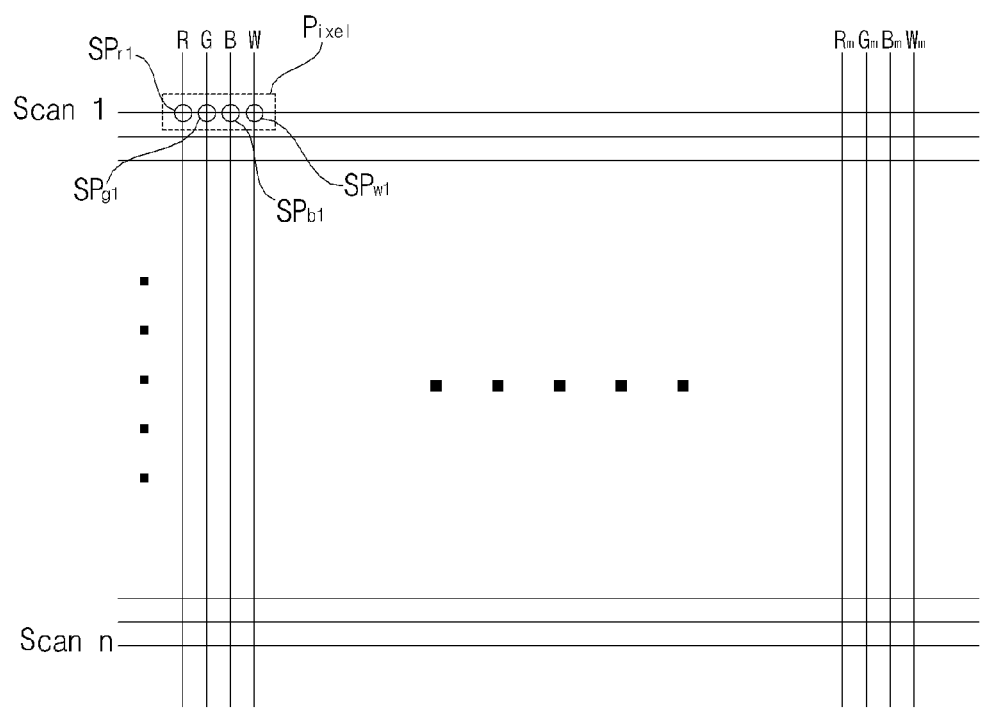
FIG. 6A and FIG. 6B are diagrams referred to in the description of an organic light emitting diode panel of FIG. 5.
Figure 6B:
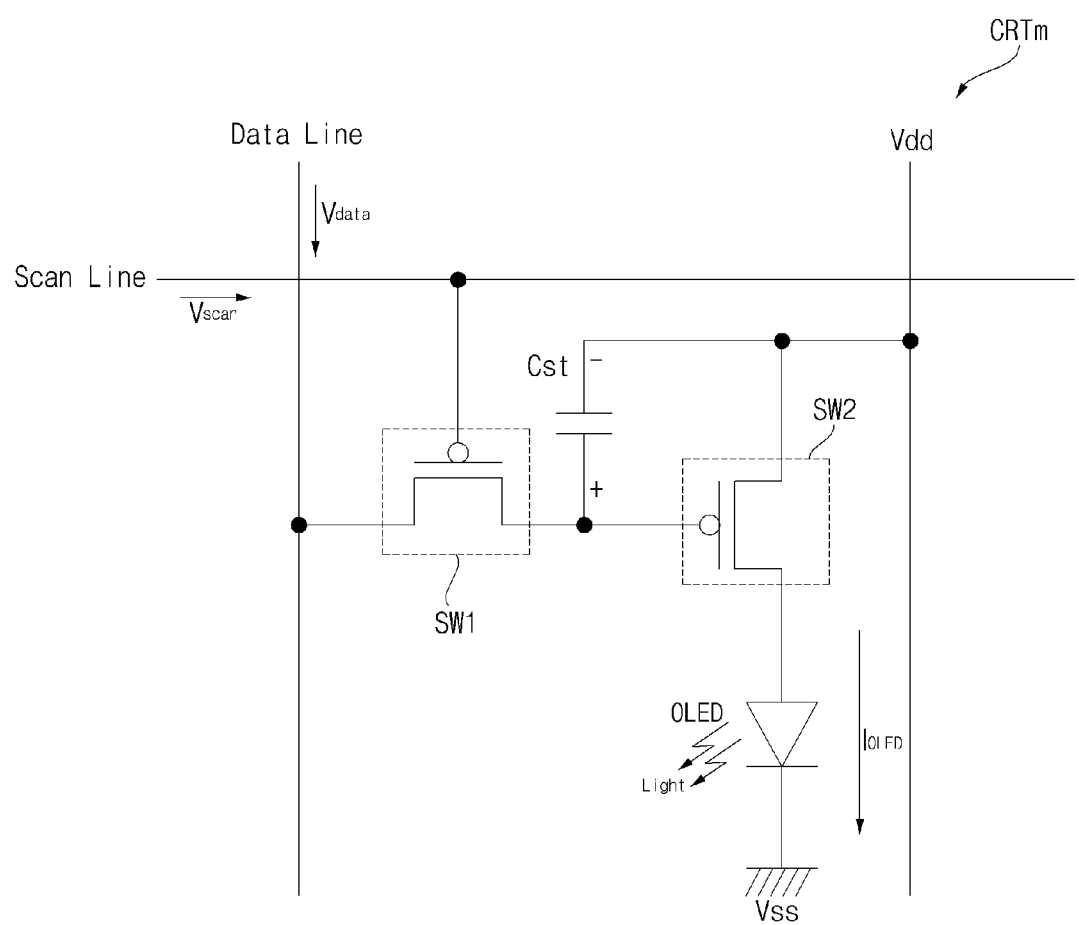

FIGS. 6A and 6B are diagrams referred to in the description of an organic light emitting diode panel of FIG. 5.

Firstly, FIG. 6A is a diagram illustrating a pixel in the organic light emitting diode panel 210.

Referring to drawing, the organic light emitting diode panel 210 may include a plurality of scan lines Scan1 to Scann and a plurality of data lines R1, G1, B1, W1 to Rm, Gm, Bin, Wm intersecting the scan lines.

Meanwhile, a pixel (subpixel) is defined in an intersecting area of the scan line and the data line in the organic light emitting diode panel 210. In the drawing, a pixel including sub-pixels SR1, SG1, SB1 and SW1 of RGBW is shown.

FIG. 6B illustrates a circuit of any one sub-pixel in the pixel of the organic light emitting diode panel of FIG. 6A.

Referring to the drawing, an OLED subpixel circuit CRT, as an active circuit, may include a switching transistor SW1, a storage capacitor Cst, a driving transistor SW2, and an organic light emitting layer OLED.

The switching transistor SW1 is turned on according to the input scan signal Vdscan, as a scan line is connected to a gate terminal. When it is turned on, the input data signal Vdata is transferred to the gate terminal of a drive switching element SW2 or one end of the storage capacitor Cst.

The storage capacitor Cst is formed between the gate terminal and the source terminal of the driving transistor SW2, and stores a predetermined difference between a data signal level transmitted to one end of the storage capacitor Cst and a DC power (VDD) level transmitted to the other terminal of the storage capacitor Cst.

For example, when the data signal has a different level according to a Plume Amplitude Modulation (PAM) method, the power level stored in the storage capacitor Cst changes according to the level difference of the data signal Vdata.

In another example, when the data signal has a different pulse width according to a Pulse Width Modulation (PWM) method, the power level stored in the storage capacitor Cst changes according to the pulse width difference of the data signal Vdata.

The driving transistor SW2 is turned on according to the power level stored in the storage capacitor Cst. When the driving transistor SW2 is turned on, the driving current (IOLED), which is proportional to the stored power level, flows in the organic light emitting layer OLED. Accordingly, the organic light emitting layer OLED performs a light emitting operation.

The organic light emitting layer OLED may include a light emitting layer (EML) of RGBW corresponding to a subpixel, and may include at least one of a hole injecting layer (HIL), a hole transporting layer (HTL), an electron transporting layer (ETL), and an electron injecting layer (EIL). In addition, it may include a hole blocking layer, and the like.

Meanwhile, all the subpixels emit a white light in the organic light emitting layer OLED. However, in the case of green, red, and blue subpixels, a subpixel is provided with a separate color filter for color implementation. That is, in the case of green, red, and blue subpixels, each of the subpixels further includes green, red, and blue color filters. Meanwhile, since a white subpixel outputs a white light, a separate color filter is not required.

Meanwhile, in the drawing, it is illustrated that a p-type MOSFET is used as the switching transistor SW1 and the driving transistor SW2, but an n-type MOSFET or other switching element such as a JFET, IGBT, SIC, or the like are also available.

Meanwhile, the pixel is a hold-type element that continuously emits light in the organic light emitting layer (OLED), after a scan signal is applied, during a unit display period, specifically, during a unit frame.

Meanwhile, subpixels emit light as a current flows to the organic light emitting layer OLED in the respective subpixels illustrated in FIG. 6B.

Figure 7:
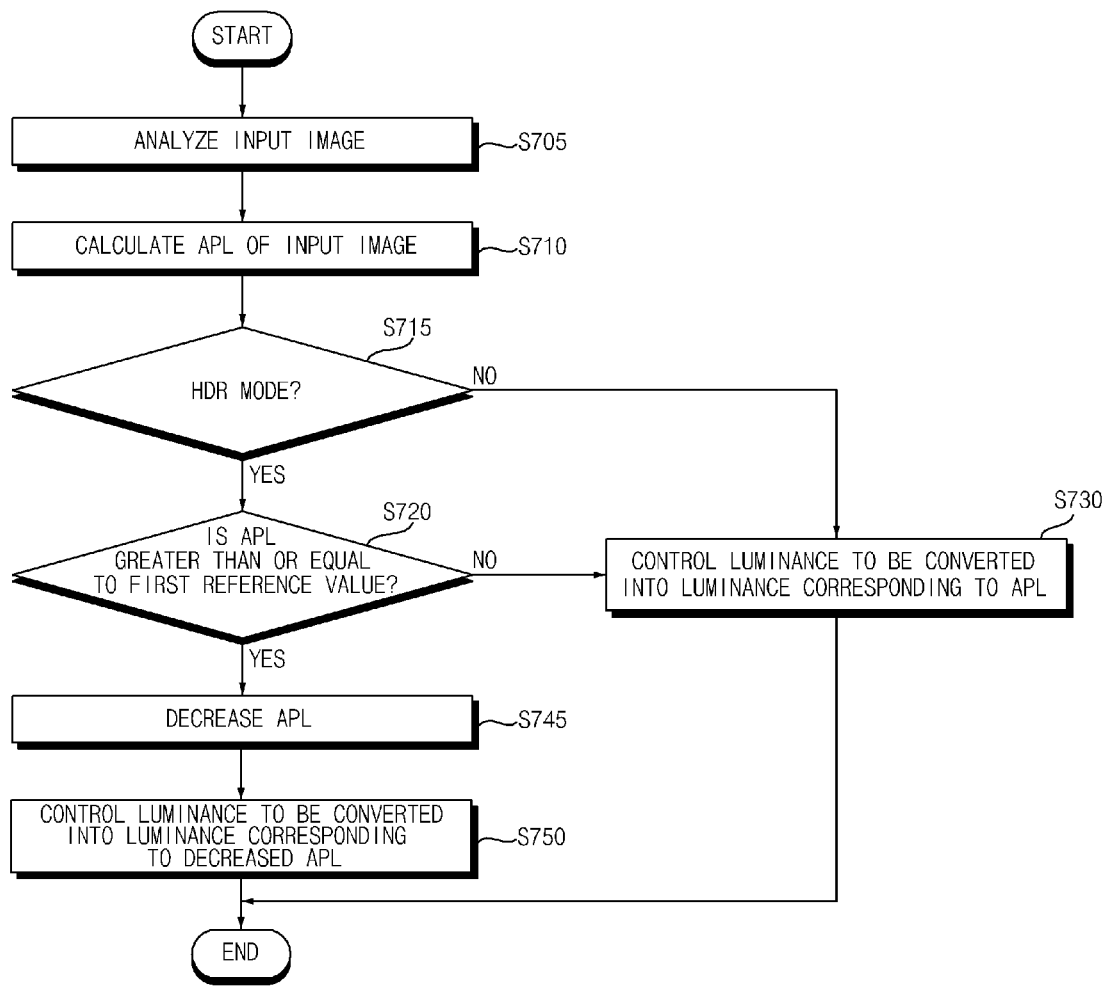
FIG. 7 is a flowchart illustrating an example of an operating method of an image display apparatus according to an embodiment of the present disclosure.

FIG. 7 is a flowchart illustrating an example of an operating method of an image display apparatus according to an embodiment of the present disclosure; and FIGS. 8 to 13C are diagrams referred to in the description of the operating method of FIG. 7.

First, referring to FIG. 7, a controller 170 may receive an input image (S705).

The input image may be an external image received from an external source, or may be an image stored in the memory 140.

For example, the input image may be a broadcast image, an image received from an external device (USB, mobile terminal, etc.), or an image stored in the memory 140.

Then, the controller 170 may analyze the input image.

Particularly, the controller 170 may calculate an Average Picture Level (APL) in units of frames or scenes of the input image (S710).

Meanwhile, the processor 170 may determine whether a display mode is an HDR mode (S715), and upon determining that a display mode is the HDR mode, the controller 170 may determine whether the calculated APL is greater than or equal to a first reference value APref.

Here, the HDR mode may be performed according to a user setting or may be performed automatically if the input image is an HDR image.

Meanwhile, once the HDR mode is activated, if the calculated APL is greater than or equal to the first reference value APref, the controller 170 may decrease the APL (S745), and may control luminance conversion to be performed based on the decreased APL (S750), thereby improving luminance. Particularly, an improved luminance representation may be provided for high luminance region, such that luminance representation during displaying image may be enhanced.

Meanwhile, upon determining in S715 that a display mode is not the HDR mode, i.e., a normal mode, the controller 170 may control luminance conversion to be performed corresponding to the calculated APL (S730).

Meanwhile, when the display is in the normal mode, rather than the HDR mode, if the calculated APL is greater than the first reference value APref, the controller 170 may control luminance conversion to be performed based on the calculated APL. Accordingly, in the normal mode, the luminance representation during displaying image is reduced compared to the HDR mode.

Figure 8:
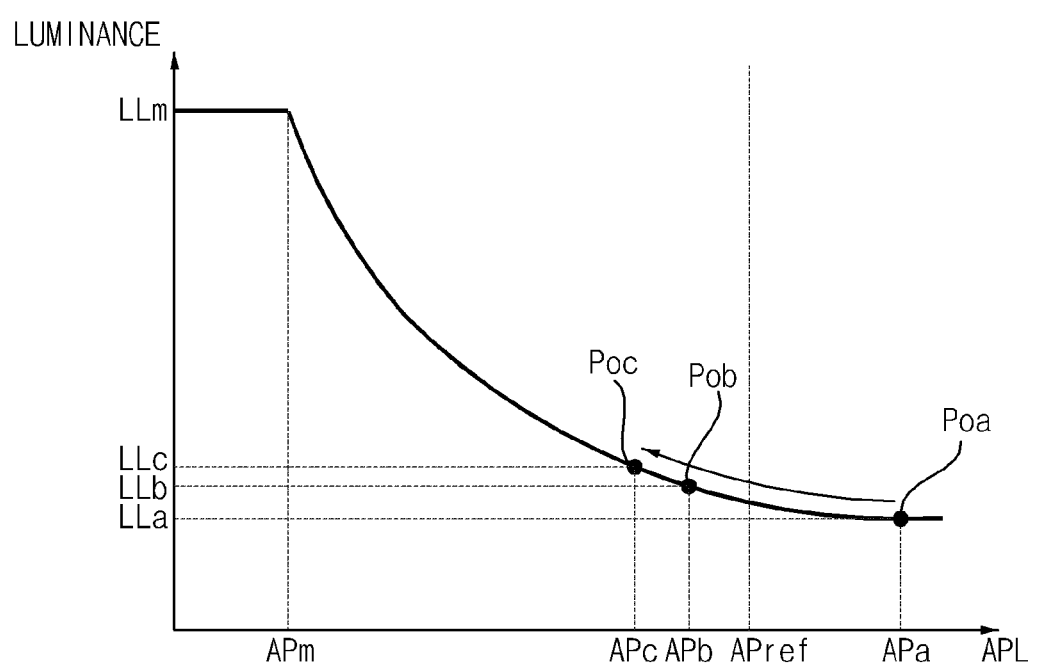
FIGS. 8 to 13C are diagrams referred to in the description of the operating method of FIG. 7.

FIG. 8 is a diagram illustrating an APL versus luminance curve.

Referring to the drawing, in the case where an image is displayed on the OLED panel 210 included in the image display apparatus 100, which is a self-luminous element, APL driving may be performed to reduce power consumption and the like.

Here, the APL driving may indicate that controlling is performed such that as the APL increases, luminance decreases, and as the APL decreases, luminance increases, as illustrated herein.

As illustrated herein, when the calculated APL is a first average picture level Apa, which is greater than or equal to the first reference value APref, and the display is in the normal mode, the controller 170 may control driving at luminance LLa, but when the display is in the HDR mode, the controller 170 may control luminance to be changed to a second average picture level Apc which is lower than the first reference value APref, and may control luminance conversion to be performed based on the second average picture level Apc, thereby improving luminance during displaying image.

Specifically, when the calculated APL is a first average picture level Apa, which is greater than or equal to the first reference value APref, and the display is in the normal mode, the controller 170 may control driving at the luminance LLa, but when the display is in the HDR mode, the controller 170 may control luminance conversion to be performed so that driving may be performed at luminance LLc which is higher than LLa. Accordingly, if the calculated APL is high in the HDR mode, luminance representation may be improved.

Meanwhile, if the luminance conversion is performed based on the second average picture level Apc rather than the first average picture level Apa, the controller 170 may control luminance to increase by a greater increment, thereby improving luminance.

Meanwhile, if, in the HDR mode, the calculated APL is a third average picture level Apb which is lower than the first reference value APref, the controller 170 may control luminance conversion to be performed based on the third average picture level Apb.

Specifically, if the calculated APL is the second average picture level Apb which is lower than the first reference value APref, the controller 170 may control driving to be performed at the luminance LLb which is higher than LLa but lower than LLc, thereby improving luminance.

In this case, if luminance conversion is performed based on the second average picture level Apc rather than the third average picture level Apb, the controller 170 may control luminance to increase by a greater increment, thereby improving luminance.

Meanwhile, in the normal mode rather than the HDR mode, if the calculated APL is the first average picture level Apa which is greater than the first reference value APref, the controller 170 may control luminance conversion to be performed based on the first average picture level Apa, thereby improving luminance.

Meanwhile, as the second average picture level Apc increases, the luminance variation during luminance conversion decreases, such that the controller 170 may improve luminance representation.

Meanwhile, during luminance conversion based on the second average picture level Apc, the controller 170 may increase luminance of a first region, which is higher than a first reference luminance, in the input image, thereby improving luminance.

Meanwhile, the controller 170 may control luminance of a region of the input image, which is lower than or equal to a second reference luminance lower than the first reference luminance, to remain as it is or to decrease, thereby improving luminance, which will be described with reference to FIG. 9.

Figure 9:
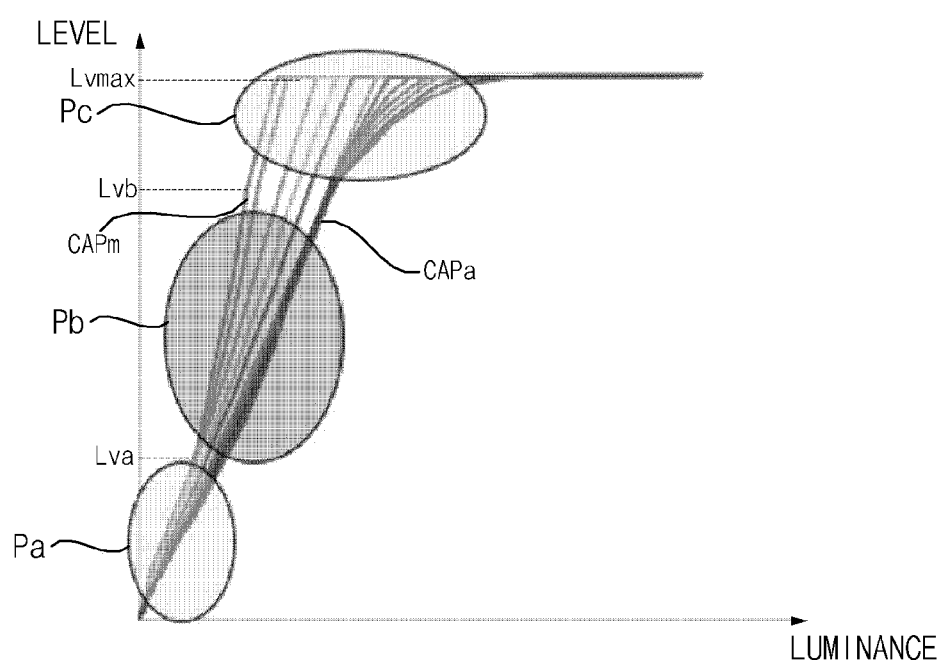

FIG. 9 is a diagram illustrating an example of performing luminance conversion based on a plurality of curves when luminance conversion of an input image is performed.

The controller 170 may calculate an average picture level (APL) in units of frames or scenes of an input image, and may control a luminance conversion curve to change based on the APL.

For example, in the case of a highest APL, the controller 170 performs luminance conversion based on a curve CAPa, and in the case of a lowest APL, the controller 170 may control luminance conversion to be performed based on a curve CAPm.

Referring to the drawing, as the APL increases, the controller 170 may decrease a luminance increment of a second peak image. Accordingly, luminance representation may be improved in consideration of power consumption.

Meanwhile, during luminance conversion, the controller 170 may divide the image into a high gradation region Pc having luminance higher than or equal to a first reference luminance LVc, an intermediate gradation region Pb having luminance between the first reference luminance LVc and a second reference luminance LVb, and a low gradation region having luminance lower than or equal to the second reference luminance LVb.

Further, during luminance conversion, the controller 170 may increase the luminance of the high gradation region Pc, thereby improving luminance.

Meanwhile, during luminance conversion, the controller 170 may control the luminance of the intermediate gradation region Pb or the low gradation region Pa to remain as it is or to decrease, thereby improving luminance.

In the drawing, an example is illustrated in which during luminance conversion of the intermediate gradation region Pb or the low gradation region Pa, a luminance conversion curve is skewed downwardly to the right, such that during luminance conversion, the luminance of the intermediate gradation region Pb or the low gradation region Pa may remain as it is or may decrease.

Figure 10A:
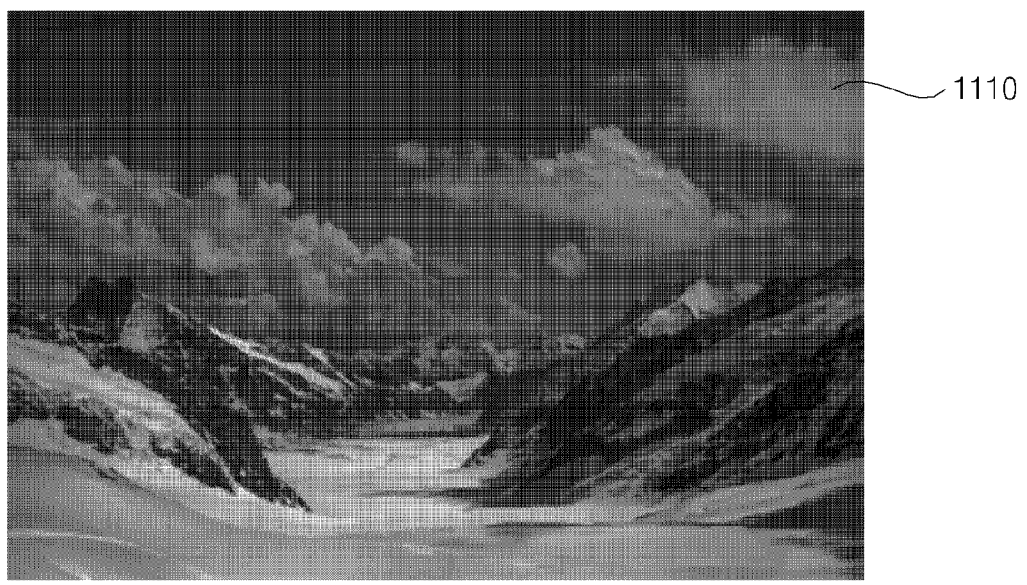

FIG. 10A is a diagram illustrating an example of an image 1110, on which luminance conversion is performed in the normal mode.

Figure 10B:
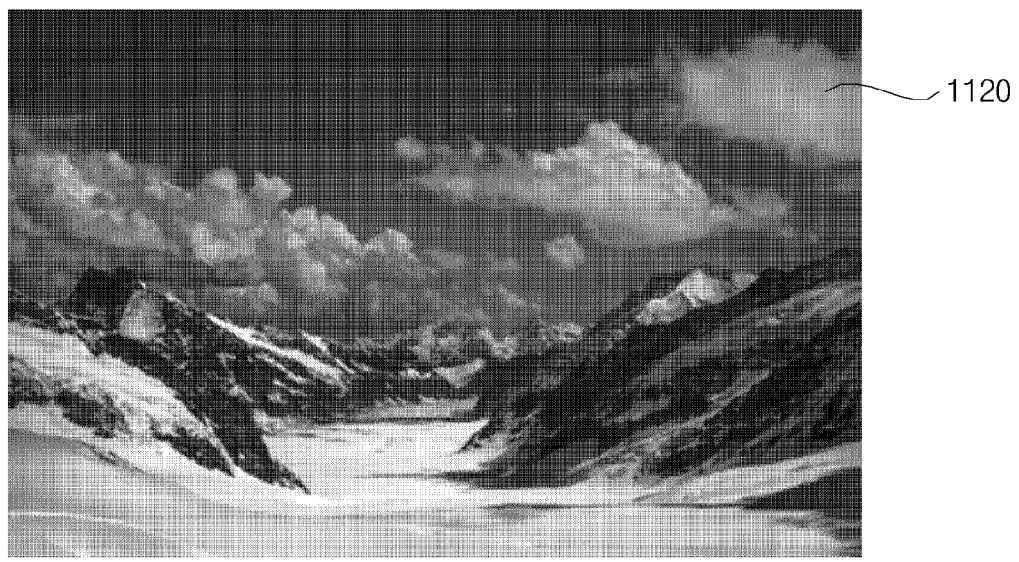

FIG. 10B is a diagram illustrating an example of an image 1120, on which luminance conversion is performed in the HDR mode if the calculated APL is higher than or equal to the first reference value APref.

It can be seen that luminance representation of the image 1120 of FIG. 10B is improved compared to FIG. 10A, thereby enhancing luminance and contrast.

Particularly, it can be seen that luminance representation of the high gradation region in the image 1120 of FIG. 10B is improved, thereby enhancing luminance and contrast.

Figure 11A:
Figure 11B:
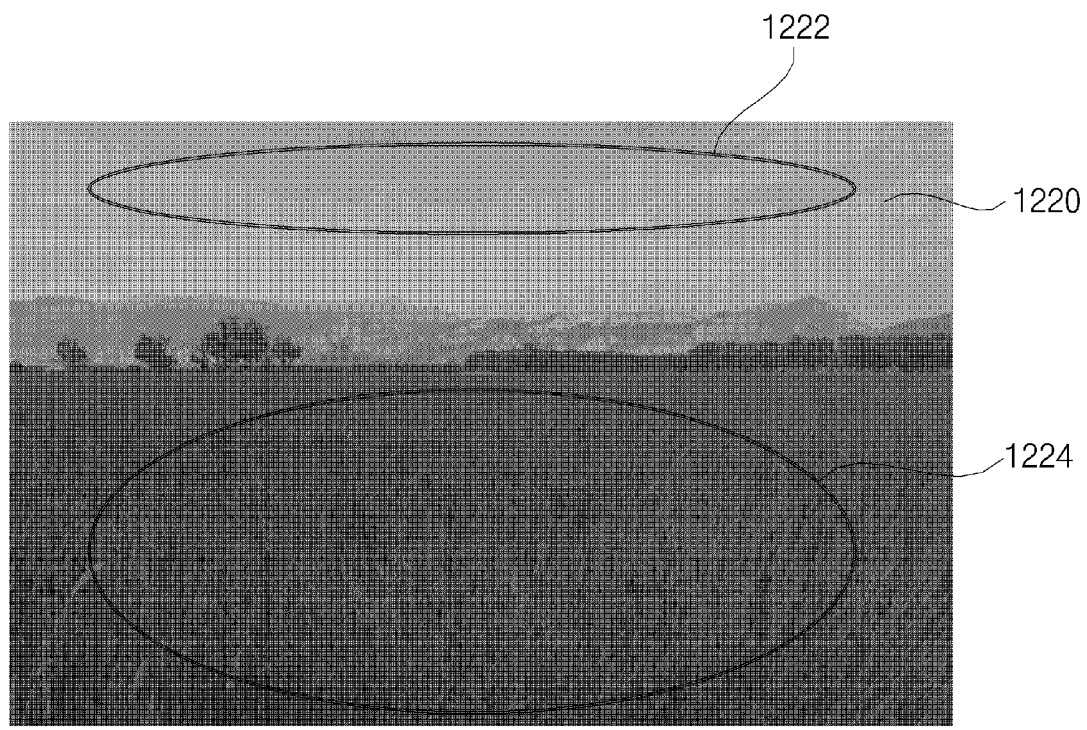

Next, FIG. 11A illustrates an input image 1210, and FIG. 11B illustrates an image 1220, on which APL driving and luminance conversion are performed such that brightness, luminance, and contrast are improved, as described above.

Particularly, brightness, luminance, and contrast of a first region 1222 in the image 1220 may be improved, and color and contrast of a second region 1224 in the image 1220 may be improved.

Figure 12A:
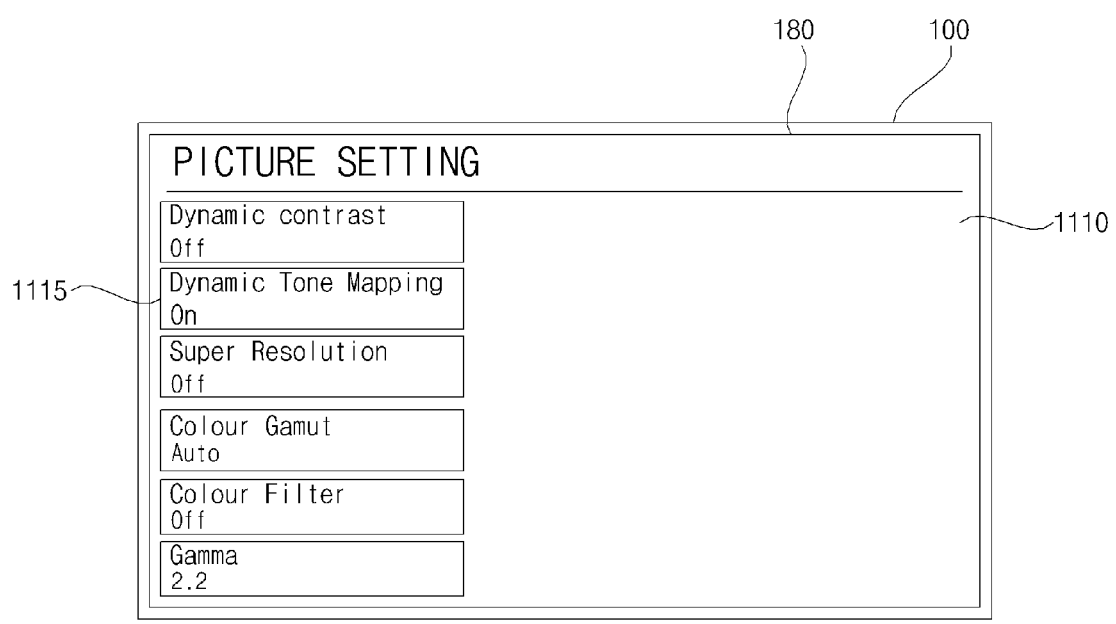

FIG. 12A is a diagram illustrating an image quality setting screen.

Referring to the drawing, when selecting a menu item of the remote controller 200, the controller 170 may control displaying of a menu screen, and when selecting an image quality setting item from the menu screen, the controller 170 may control an image quality setting screen 1110 to be displayed as illustrated herein.

The image quality setting screen 1110 may include a dynamic contrast item for a contrast setting, a dynamic tone mapping item 1115 for a luminance setting, a super resolution item for a resolution setting, a color gamut item for a color gamut setting, a color filter item for a color setting, a gamma item for a gamma setting, and the like.

Figure 12B:
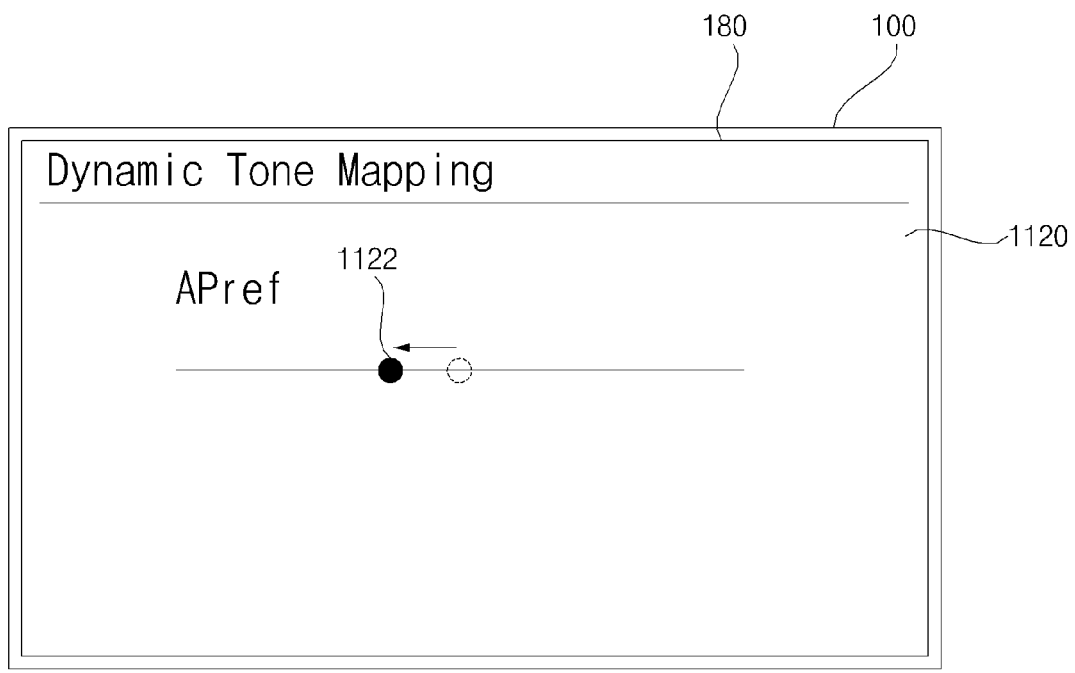

If the dynamic tone mapping item 1115 is selected based on a button input of the remote controller 200 or based on a selection input by a pointer 205 displayed corresponding to movement of the remote control apparatus 200, the controller 170 may control a dynamic tone mapping screen 1120 for setting luminance to be displayed as illustrated in FIG. 12B.

Meanwhile, the dynamic tone mapping screen 1120 may include a first reference value item 1122 for setting a level of the first reference value Apref, and a second reference value item 1124 for setting a level of the second reference value Refb.

Based on a button input of the remote controller 200 or based on the pointer 205 displayed corresponding to movement of the remote controller 200, the controller 170 may select the first reference value item 1122 and may change the level of the first reference value. Accordingly, luminance and contrast may be set according to a user's preference.

FIG. 12B is a diagram illustrating an example in which the first reference value item 1122 is moved leftward according to a leftward movement of the pointer 205 displayed corresponding to the movement of the remote controller 200. Accordingly, the controller 170 may lower the level of the first reference value Apref.

Figure 12C:
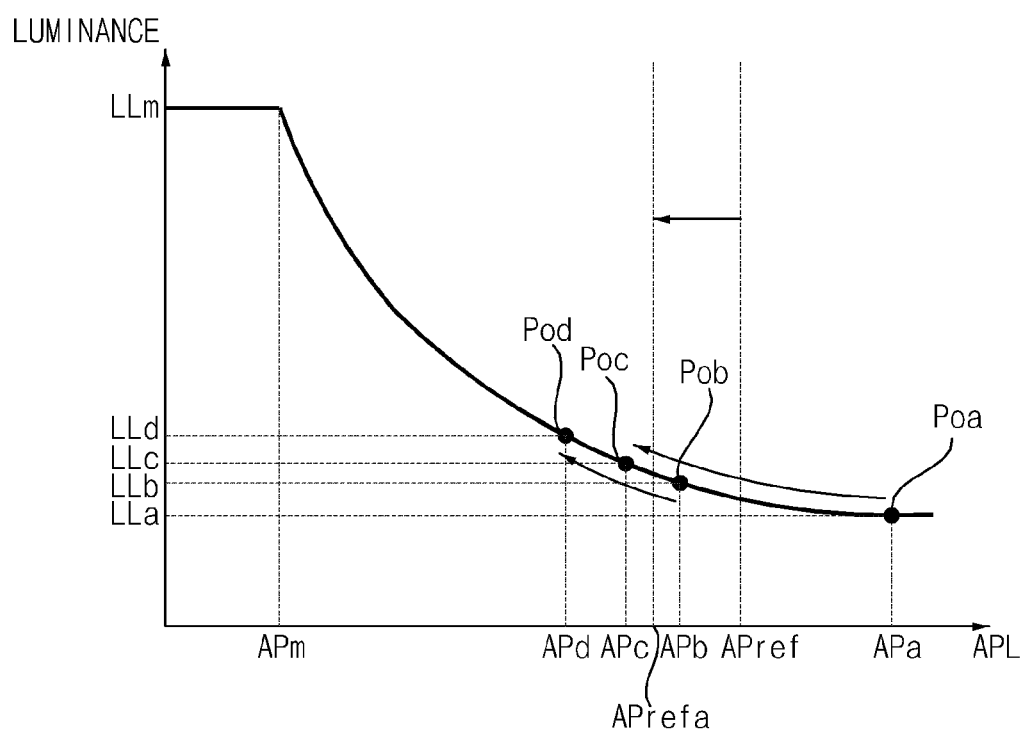

Accordingly, a reference level Aprefa, lower than the level of the first reference value Apref, may be set as illustrated in FIG. 12C.

Meanwhile, when the lowered first reference value Aprefa is set as illustrated in FIG. 12C, if the lowered first reference value Aprefa is lower than the third average picture level Apb, i.e., if the third average picture level Apb is greater than or equal to the lowered first reference value Aprefa, the controller 170 may control the third average picture level Apb to be changed to a fourth average picture level Apd which is lower than the lowered first reference value Aprefa, and may control luminance conversion to be performed based on the second average picture level Apd. Particularly, the controller 170 may control luminance conversion to be performed at luminance LLD. As described above, by lowering the first reference value Aprefa, luminance representation during displaying image may be enhanced.

Meanwhile, in response to a setting input, the controller 170 may change the level of the first reference value APref.

Meanwhile, as the level of the first reference value APref decreases, the controller 170 may expand an APL-variable region, and may increase luminance of the expanded APL-variable region. Accordingly, luminance representation may be improved during displaying image.

Meanwhile, while receiving an image, having a first pattern PTma and a second pattern which is gradually reduced in size, if a size of the second pattern is greater than or equal to a reference size, the controller 170 may increase luminance of the pattern; and if a size of the second pattern is smaller than the reference size, the controller 170 may control luminance of the pattern to be maintained at a predetermined level, or may control luminance of the pattern to remain as it is. Accordingly, luminance representation may be improved during displaying image, which will be described with reference to FIGS. 13A to 13C.

Figure 13A:
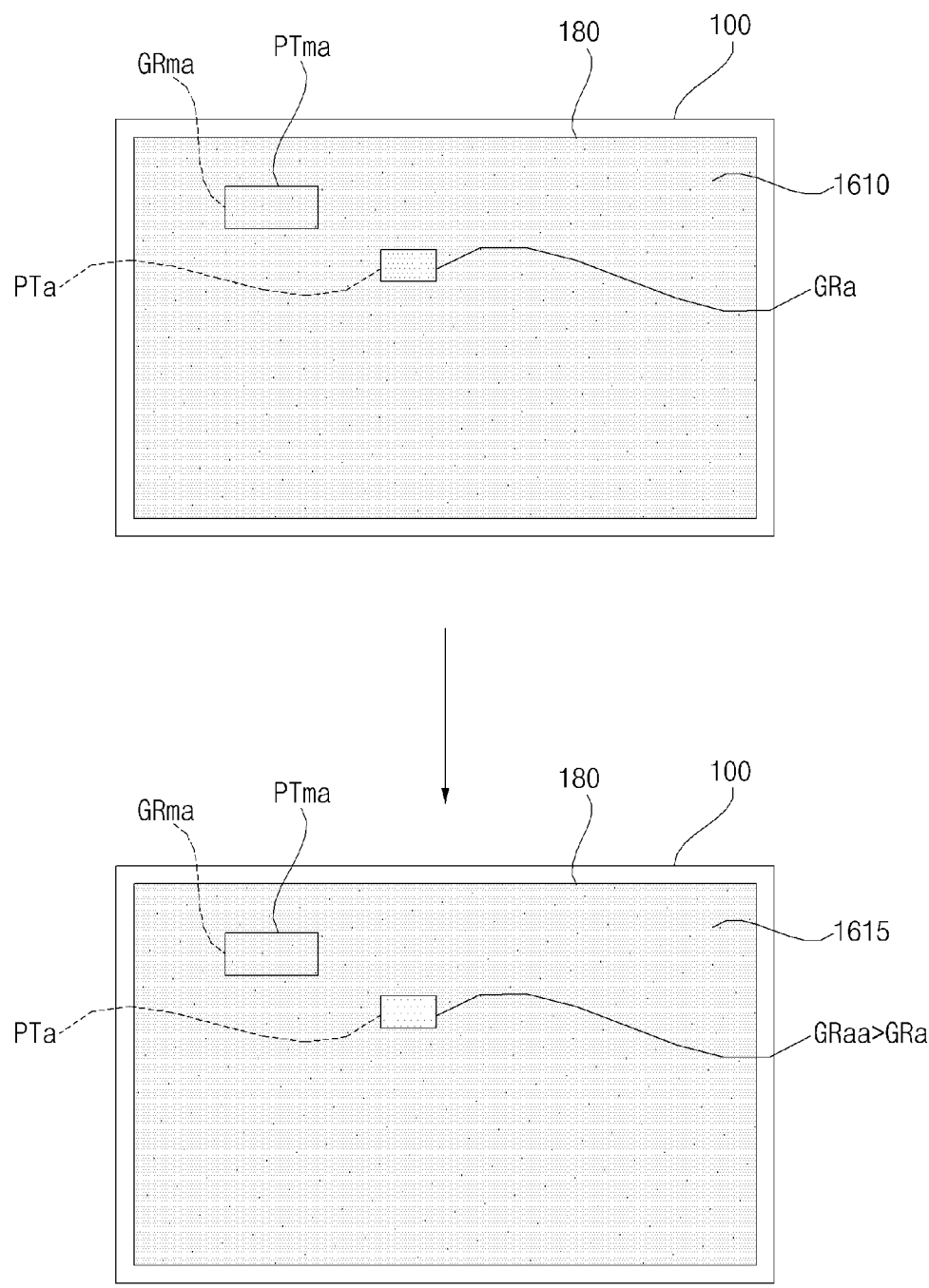

First, FIG. 13A illustrates an example in which a size of the first pattern PTma is fixed and a size of the second pattern PTa is a first size, in an input image 1610. Particularly, the second pattern PTa has high gradation, which is higher than that of the first pattern PTma.

In the drawing, it is illustrated that luminance of the first pattern PTma is Grma, and luminance of the second pattern Pta is Gra which is higher than Grma.

Particularly, as described above, the second pattern PTa may correspond to a case where a luminance level is greater than or equal to the first reference value.

If, in the HDR mode, the size of the second pattern PTa in an input image 1610 is a first size greater than or equal to the reference size, the controller 170 may increase luminance of the pattern, so that the luminance GRa may increase to Graa.

In this manner, luminance representation of the second pattern PTa in the input image 1610 may be improved.

Figure 13B:
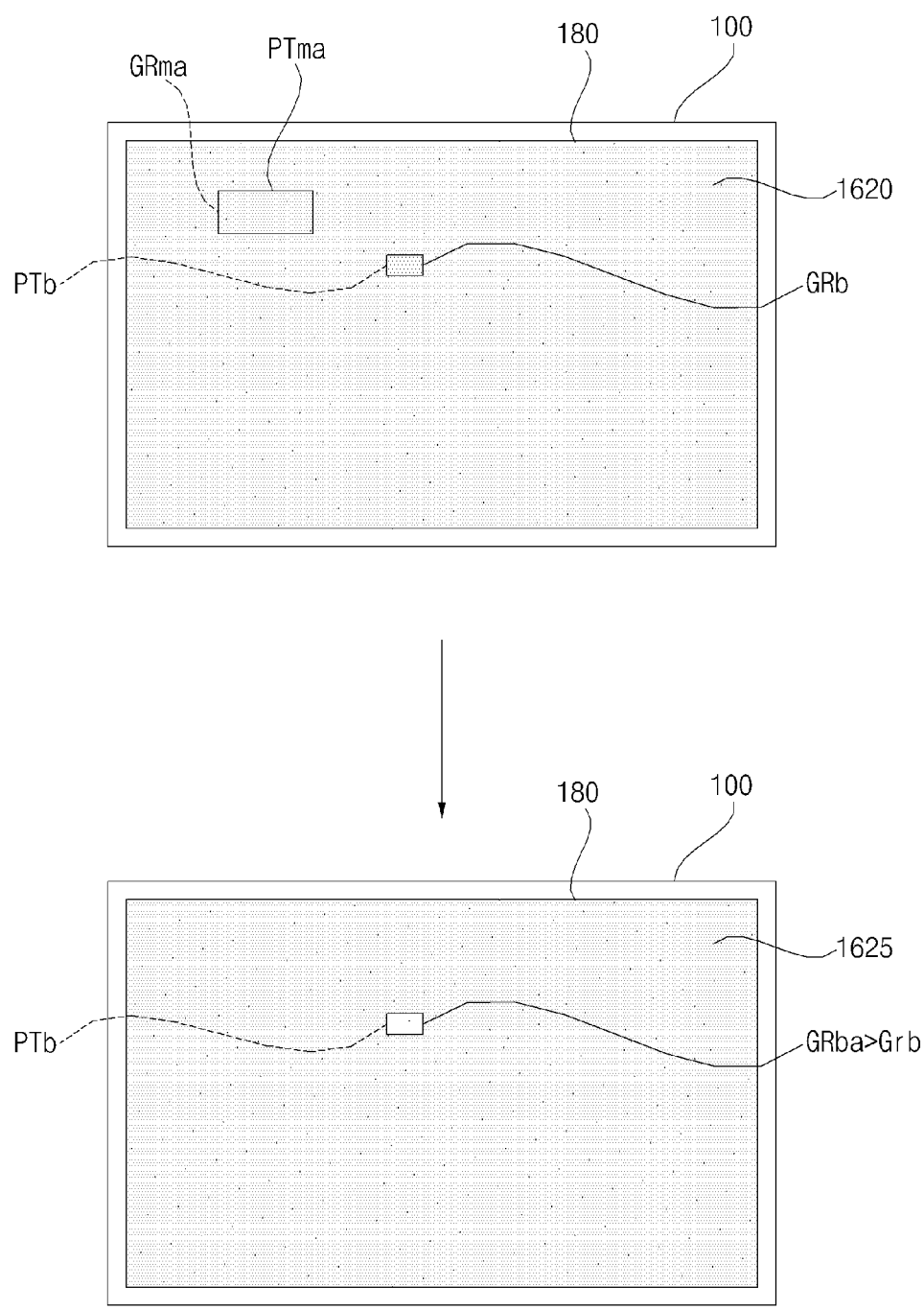

Then, FIG. 13B illustrates an example in which a size of the first pattern PTma is fixed and a size of the second pattern PTb is a second size, in the input image 1610.

If, in the HDR mode, the size of the second pattern PTb in an input image 1620 is the second size, which is smaller than the first size of FIG. 13A but greater than or equal to the reference size, the controller 170 may increase luminance of the pattern, so that luminance GRb may increase to Grba.

In this manner, luminance representation of the second pattern PTb in the input image 1620 may be enhanced. Meanwhile, a luminance increment may be smaller than that of FIG. 13A.

Figure 13C:
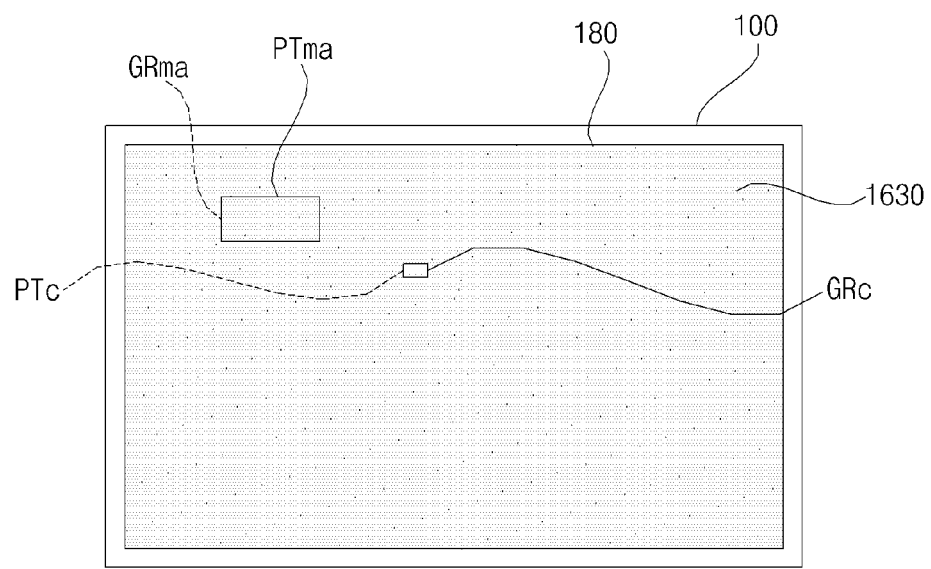
Figure 13C:
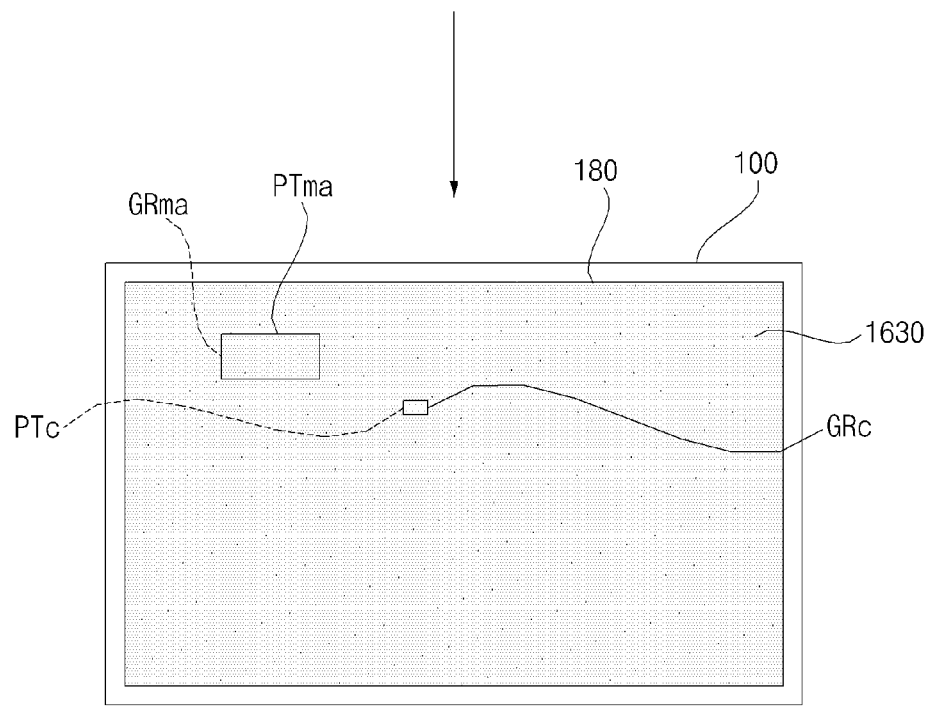

Next, FIG. 13C illustrates an example in which a size of the first pattern PTma in the input image is fixed, and a size of the second pattern PTb is a third size.

If, in the HDR mode, the size of the second pattern PTc in an input image 163 is a third size, which is smaller than the second size of FIG. 13B and the reference size, the controller 170 may control luminance GRc to remain as Grc without changing luminance of the pattern.

Accordingly, by changing luminance conversion according to a pattern size relative to the entire image, optimal luminance and contrast representation of the input image may be provided.

An image display apparatus according to an embodiment of the present disclosure includes: a display including an organic light emitting diode panel (OLED panel); and a controller configured to control the display, wherein the controller calculates an Average Picture Level (APL) of an input image, and in response to the calculated APL being greater than or equal to a first reference value in a high-dynamic range (HDR) mode, the controller decreases the APL and perform luminance conversion based on the decreased APL, and in response to the calculated APL being greater than or equal to the first reference value in a normal mode rather than the HDR mode, the controller performs luminance conversion based on the calculated APL, thereby luminance representation may be improved during displaying image.

Particularly, in the HDR mode, luminance representation may be improved during displaying image.

Meanwhile, in response to the calculated APL being greater than or equal to the first reference value while not being in the HDR mode, the controller may control luminance conversion to be performed based on the calculated APL. Accordingly, in the normal mode, luminance representation during displaying image is reduced compared to the HDR mode.

Meanwhile, in the HDR mode, in response to the calculated APL being a first APL which is greater than or equal to the first reference value, the controller may control the first APL to be changed to a second APL, which is lower than the first reference value, and may control luminance conversion to be performed based on the second APL. Accordingly, luminance representation may be improved during displaying image.

Meanwhile, during luminance conversion based on the second APL, the controller may increase luminance of a first region of the input image, which is higher than a first reference luminance. Accordingly, luminance representation may be improved during displaying image.

Meanwhile, the controller may control luminance of a region of the input image, which is lower than or equal to a second reference luminance lower than the first reference luminance, to remain as it is or to decrease. Accordingly, luminance representation may be improved during displaying image.

Meanwhile, as the second APL increases, the controller may decrease a luminance increment during luminance conversion. Accordingly, luminance representation may be improved during displaying image.

Meanwhile, in the HDR mode, in response to the calculated APL being a third APL which is lower than the first reference value, the controller may control luminance conversion to be performed based on the third APL. Accordingly, luminance representation may be improved during displaying image.

Meanwhile, during the luminance conversion based on the second APL rather than the third APL, the controller may increase luminance by a greater increment. Accordingly, luminance representation may be improved during displaying image.

Meanwhile, in the normal mode rather than the HDR mode, in response to the calculated APL being the first APL which is greater than or equal to the first reference value, the controller may control luminance conversion to be performed based on the first APL. Accordingly, luminance representation may be improved during displaying image.

Meanwhile, during the luminance conversion based on the second APL rather than the first APL, the controller may increase luminance by a greater increment. Accordingly, luminance representation may be improved during displaying image.

Meanwhile, while controlling luminance of the input image based on the APL, in response to there being a first luminance region and a second luminance region in the input image, the second luminance region having luminance lower than that of the first luminance region, the controller may control luminance of the first luminance region to increase more. Accordingly, luminance representation may be improved during displaying image.

Meanwhile, in response to a setting input, the controller may change a level of the first reference value.

Meanwhile, as the level of the first reference value decreases, the controller may expand an APL-variable region, and may increase luminance of the expanded APL-variable region. Accordingly, luminance representation may be improved during displaying image.

Meanwhile, in response to an input of an image quality setting, the controller may control displaying of an image quality setting menu for setting an image quality, and in response to a dynamic tone mapping item being selected from the image quality setting menu, the controller may control displaying of a dynamic tone mapping screen for changing the first reference value. Accordingly, luminance representation may be improved during displaying image.

Meanwhile, the controller may receive a pointing signal from a remote controller, and may control displaying of a pointer, corresponding to the pointing signal, on the dynamic tone mapping screen. Accordingly, the controller may perform luminance conversion based on the pointer and the like.

Meanwhile, while receiving an image having a first pattern, and a second pattern which is gradually reduced in size, in response to a size of the second pattern being greater than or equal to a reference size, the controller may increase luminance of the pattern, and in response to the size of the second pattern being smaller than the reference size, the controller may control luminance of the pattern to be maintained at a predetermined level or to remain as it is. Accordingly, luminance representation may be improved during displaying image.

Meanwhile, an image display apparatus according to another embodiment of the present disclosure includes: a display; and a controller configured to control the display, wherein while receiving an image having a first pattern, and a second pattern which is gradually reduced in size, in response to a size of the second pattern being greater than or equal to a reference size, the controller may increase luminance of the pattern, and in response to the size of the second pattern being smaller than the reference size, the controller may control luminance of the pattern to be maintained at a predetermined level or to remain as it is. Accordingly, luminance representation may be improved during displaying image.

Meanwhile, the controller may control the luminance of the first pattern to remain as it is or to decrease. Accordingly, luminance representation may be improved during displaying image.

Meanwhile, an operating method of the image display apparatus according to the present disclosure can be realized as a processor-readable code written on a recording medium readable by a processor included in the image display apparatus. The processor-readable recording medium may be any type of recording device in which data is stored in a processor-readable manner. Examples of the processor-readable recording medium include a ROM, a RAM, a CD-ROM, a magnetic tape, a floppy disc, an optical data storage, and a carrier wave, e.g., data transmission through the Internet. The processor-readable recording medium can be distributed over a plurality of computer systems connected to a network so that a processor-readable code is written thereto and executed therefrom in a decentralized manner.

While the present disclosure has been shown and described with reference to the preferred embodiments thereof, it should be understood that the present disclosure is not limited to the aforementioned specific embodiments, and various modifications and variations may be made by those skilled in the art without departing from the scope and spirit of the invention as defined by the appended claims, and the modified implementations should not be construed independently of the technical idea or prospect of the present disclosure.

What is claimed is:

1. An image display apparatus, comprising:
a display including an organic light emitting diode panel (OLED panel); and
a controller configured to control the display,
wherein the controller calculates an Average Picture Level (APL) of an input image, and in response to the calculated APL being greater than or equal to a first reference value in a high-dynamic range (HDR) mode, the controller decreases the APL and perform luminance conversion based on the decreased APL, and in response to the calculated APL being greater than or equal to the first reference value in a normal mode rather than the HDR mode, the controller performs luminance conversion based on the calculated APL,
wherein the controller is further configured to:
in the HDR mode, in response to the calculated APL being a first APL which is greater than or equal to the first reference value, control the first APL to be a second APL, which is lower than the first reference value, and perform luminance conversion based on the second APL; and in a luminance conversion in which an input luminance is converted to an output luminance;
perform the luminance conversion based on a first luminance conversion curve corresponding to a minimum value of a second average luminance level and a second luminance conversion curve corresponding to a maximum value of the second average luminance level;
in response to the input luminance being less than or equal to a first level, enlarge a downward skew section in the second luminance conversion curve rather than in the first luminance conversion curve, wherein the output luminance becomes smaller in the downward skew section; and
in response to the input luminance being greater than the first level, enlarge a saturation start level of the input luminance in the second luminance conversion curve rather than in the first luminance conversion curve, wherein the output luminance starts to be converted to a constant level at the saturation start level of the input luminance.

2. The image display apparatus of claim 1, wherein in response to the calculated APL being greater than or equal to the first reference value while not being in the HDR mode, the controller performs luminance conversion based on the calculated APL.

3. The image display apparatus of claim 1, wherein during luminance conversion based on the second APL, the controller increases luminance of a first region of the input image, which is higher than a first reference luminance.

4. The image display apparatus of claim 3, wherein the controller controls luminance of a region of the input image, which is lower than or equal to a second reference luminance lower than the first reference luminance, to remain as it is or to decrease.

5. The image display apparatus of claim 1, wherein as the second APL increases, the controller decreases a luminance increment during luminance conversion.

6. The image display apparatus of claim 1, wherein in the HDR mode, in response to the calculated APL being a third APL which is lower than the first reference value, the controller performs luminance conversion based on the third APL.

7. The image display apparatus of claim 6, wherein during the luminance conversion based on the second APL rather than the third APL, the controller increases luminance by a greater increment.

8. The image display apparatus of claim 1, wherein in the normal mode rather than the HDR mode, in response to the calculated APL being the first APL which is greater than or equal to the first reference value, the controller performs luminance conversion based on the first APL.

9. The image display apparatus of claim 1, wherein during the luminance conversion based on the second APL rather than the first APL, the controller increases luminance by a greater increment.

10. The image display apparatus of claim 1, wherein while controlling luminance of the input image based on the APL, in response to there being a first luminance region and a second luminance region in the input image, the second luminance region having luminance lower than that of the first luminance region, the controller controls luminance of the first luminance region to increase more.

11. The image display apparatus of claim 1, wherein as the level of the first reference value decreases, the controller increases an APL-variable region, and increases luminance of the increased APL-variable region.

12. The image display apparatus of claim 1, further comprising an interface for receiving a pointing signal from a remote controller,
   wherein the controller is configured to display a pointer, corresponding to the pointing signal, on a dynamic tone mapping screen.

13. The image display apparatus of claim 1,
   wherein when a first image including a first pattern having a fixed size and a second pattern having a first size and having a luminance level higher than a luminance level of the first pattern is received, and the first size is greater than or equal to a reference size, the controller is configured to increase the luminance level of the second pattern of the first image by a first level in the HDR mode,
   wherein when a second image including the first pattern having the fixed size, and a second pattern having a second size smaller than the first size and having a luminance level higher than the luminance level of the first pattern is received, and the second size is greater than or equal to the reference size, the controller is configured to increase the luminance level of the second pattern of the second image by a second level smaller than the first level in the HDR mode, and
   wherein when a third image including the first pattern having the fixed size, and a second pattern having a third size smaller than the reference size and having a luminance level higher than the luminance level of the first pattern is received, the controller is configured not to change the luminance level of the second pattern of the third image in the HDR mode.

* * * * *